US012541295B2

(12) United States Patent
 Kittur et al.

(10) Patent No.: US 12,541,295 B2
(45) Date of Patent: Feb. 3, 2026

(54) METHODS AND SOFTWARE FOR BUNDLE-BASED CONTENT ORGANIZATION, MANIPULATION, AND/OR TASK MANAGEMENT

(71) Applicant: Carnegie Mellon University, Pittsburgh, PA (US)

(72) Inventors: Aniket Kittur, Pittsburgh, PA (US); Joseph C. Chang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 134 days.

(21) Appl. No.: 18/285,437

(22) PCT Filed: Apr. 29, 2022

(86) PCT No.: PCT/US2022/026902
§ 371 (c)(1),
(2) Date: Oct. 3, 2023

(87) PCT Pub. No.: WO2022/232490
PCT Pub. Date: Nov. 3, 2022

(65) Prior Publication Data
US 2024/0111411 A1   Apr. 4, 2024

Related U.S. Application Data

(60) Provisional application No. 63/181,271, filed on Apr. 29, 2021.

(51) Int. Cl.
*G06F 3/0486* (2013.01)
*G06F 3/0483* (2013.01)
*G06Q 10/0631* (2023.01)

(52) U.S. Cl.
CPC .......... *G06F 3/0486* (2013.01); *G06F 3/0483* (2013.01); *G06Q 10/06311* (2013.01)

(58) Field of Classification Search
CPC .. G06F 3/0486; G06F 3/0483; G06F 3/04812; G06F 3/0482; G06F 3/048; G06F 16/955; G06Q 10/06311
See application file for complete search history.

(56) References Cited

U.S. PATENT DOCUMENTS 5,884,306 A  *  3/1999  Bliss ..................... G06F 3/0481
2002/0067380 A1     6/2002  Graham
(Continued)

OTHER PUBLICATIONS

International Search Report and Written Opinion dated Sep. 6, 2022, in connection with PCT/US2022/026902 filed Apr. 29, 2022.
(Continued)

*Primary Examiner* — Jeanette J Parker
(74) *Attorney, Agent, or Firm* — Downs Rachlin Martin PLLC

(57) ABSTRACT

Methods for assisting one or more users in organizing content-items, such as location information (e.g., URLs) for online information resources (e.g., webpages) and clips taken from information resources, accessed via content-access software, such as one or more web browsers, using a content item-bundle primitive that allows users to create, build, manipulate, and/or populate their own content-item bundles according to their information investigation and collection desires/needs. In some embodiments, the methods include automatically bundling content items into suggested content-item bundles based on learned relationships among various content items. In some embodiments, the methods can be implemented to provide bundle-based task managers that allow users to not only organize their content items but also define tasks and/or projects rooted in the content-item-bundle primitive. Further embodiments are disclosed, as is software for executing disclosed methods.

21 Claims, 8 Drawing Sheets

(56) References Cited

U.S. PATENT DOCUMENTS

| | | | |
|---|---|---|---|
| 2006/0112108 | A1 | 5/2006 | Eklund et al. |
| 2007/0100882 | A1 | 5/2007 | Hochwarth et al. |
| 2007/0226204 | A1 | 9/2007 | Feldman |
| 2008/0168380 | A1 | 7/2008 | Kodimer et al. |
| 2009/0158200 | A1* | 6/2009 | Palahnuk ............ G06Q 30/0273 715/781 |
| 2012/0035925 | A1* | 2/2012 | Friend ..................... G06F 16/68 704/235 |
| 2020/0380051 | A1* | 12/2020 | Sadahiro ............. G06F 16/9537 |
| 2021/0383252 | A1* | 12/2021 | Arnold .................. G06F 3/0483 |
| 2022/0284377 | A1* | 9/2022 | Liang ............ G06Q 10/063118 |

OTHER PUBLICATIONS

Chang, Joseph Chee et al., SearchLens: Composing and Capturing Complex User Interests for Exploratory Search; IUI '19; Mar. 17-20, 2019, Marina del Rey, CA; ACM ISBN 978-1-4503-6272; https://doi.org/10.1145/3301275.3302321; pp. 498-508.

Chang, Joseph Chee et al., Mesh: Scaffolding Comparison Tables for Online Decision Making; Session 4B: Online Communities, Data Collection, and the Web; UIST '20, Oct. 20-23, 2020, Virtual Event, USA; ACM ISBN 978-1-4503-7514-6/20/10; http://dx.doi.org/10.1145/3379337.3415865; pp. 391-405.

* cited by examiner

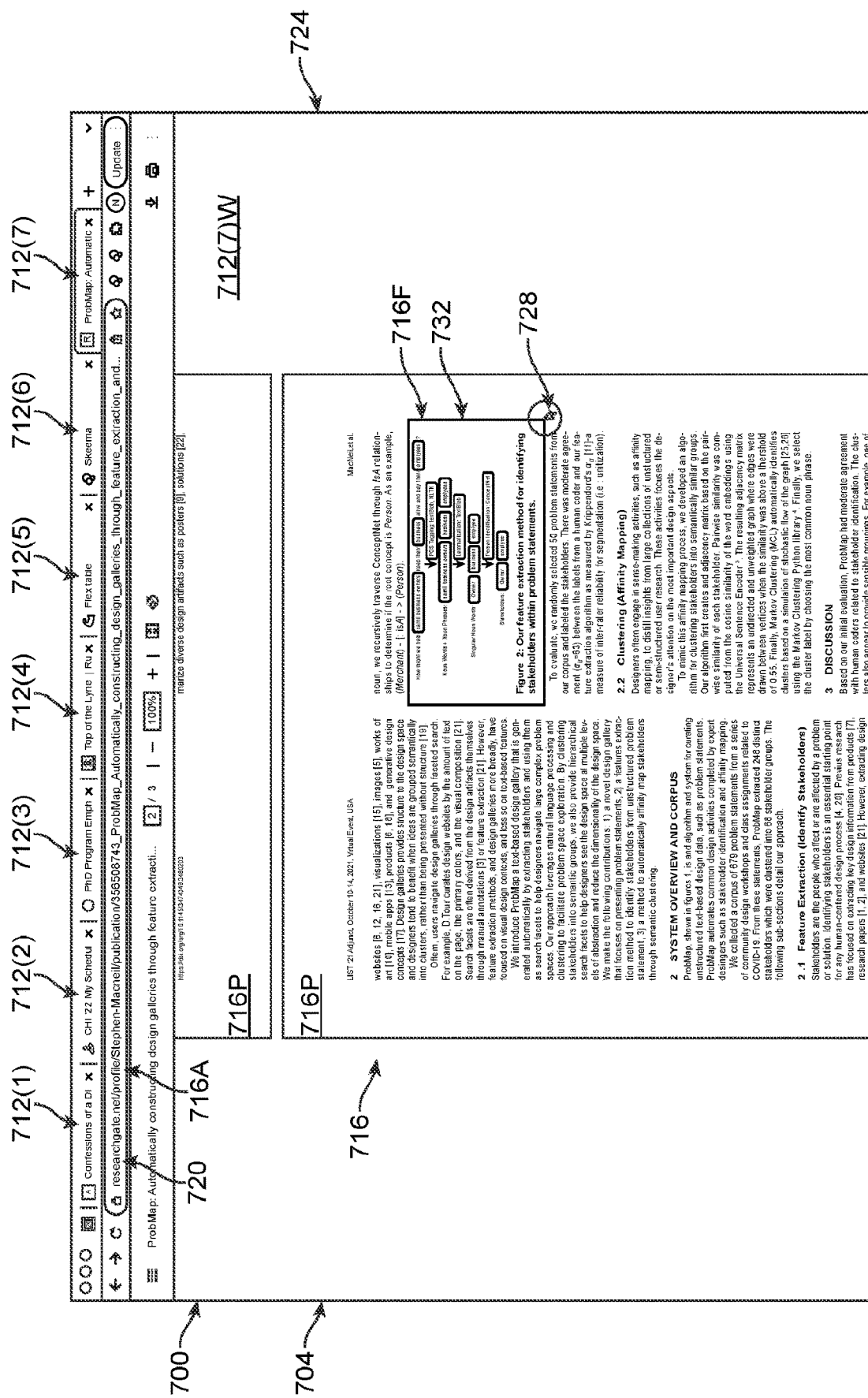

METHODS AND SOFTWARE FOR BUNDLE-BASED CONTENT ORGANIZATION, MANIPULATION, AND/OR TASK MANAGEMENT

RELATED APPLICATION DATA

This application claims the benefit of priority of U.S. Provisional Patent Application Ser. No. 63/181,271, filed Apr. 29, 2021, and titled "Method and System for Task-Centric Browser Tab Management", which is incorporated by reference herein in its entirety.

GOVERNMENT RIGHTS CLAUSE

This invention was made with United States government support under N00014-19-1-2454 awarded by the Office of Naval Research. The U.S. government has certain rights in the invention.

FIELD OF THE INVENTION

The present invention generally relates to the field of electronic content browsers. In particular, the present invention is directed to methods and software for bundle-based content organization, manipulation, and/or task management.

BACKGROUND

Despite web browsers being responsible for how an increasingly significant proportion of the tasks in our professional and personal lives are accomplished, browser interfaces for managing those tasks have changed little in the past 20 years since tabbed browsing was popularized. Today's Internet users interact with a dramatically different web than the web of two decades ago, including tremendous growth in size and complexity. The amount of time the average Internet user spends online has also grown: when tabs were introduced to the Mozilla browser in 2002, people spent on average 7 hours online per week; that number is now approaching 7 hours per day.

The mismatch between the growing size and usage of the Internet with relatively static web-browser interfaces suggests the possibility that the original tabbed browsing paradigm may no longer be sufficient for today's complex online tasks. There is mounting evidence for this, including dozens of popular press articles characterizing issues such as "tab overload" or "tab hoarding" as well as the rise of bookmarking tools, such as Pocket (over 1 billion pieces of content saved) and Pinterest (over 450 million users), and tab management tools such as OneTab or SessionBuddy (over 1 million users each) aiming to reduce the number of open tabs users have open. Some browsers such as Chrome and Firefox have introduced or are experimenting with enabling users to combine several tabs into a single group to help with tab overload. The general approach taken by the above tools is to save tabs and close them, either individually, as groups, or as whole sessions, putting them out of sight, enabling users to free their attention and reduce clutter while being able to (in theory, at least) reload those tabs later.

However, a recent study interviewing information professionals and surveying a wider audience, many of whom tried using solutions such as the above, points to more fundamental problems with tabbed browsing that raises concerns about the above approaches. Specifically, one source noted that browser tabs are often used for a variety of task management functions that they were not necessarily designed for, ranging from reminding to prioritization, but function suboptimally for doing so. For example, users keep tabs open: so that they can resume progress on their tasks but cannot easily switch focus between sets of tabs for their different tasks; as reminders that quickly lose reminding value as they pile up; as reading lists of items that are never actually read and result in clutter; and as manifestations of their mental models that are artificially forced into a simple, temporal and linear list. This suggests a divide between current browser designs that treat browser tabs as stacks of individual webpages and users who see groupings of tabs as their current and future tasks.

As a result, many attempts to address issues with tabbed browsing by addressing the surface-level problem of closing tabs run the risk of conflicting with tabs' implicit task management functions. For example, bookmarking and closing tabs results in a lack of reminding and resurfacing functionality that users describe as leading to a "black hole" effect in which closed tabs are unlikely to ever be encountered again. Other issues result from approaches such as tab groups, which may serve as a temporary stopgap but can result in overload as their numbers grow. More sophisticated approaches allow users to create workspaces of tabs that they can suspend and resume, such as in the Toby or the WORKONA® tab managers. However, while these workspaces can work well for relatively static tasks, users noted the challenges of manually creating and managing static workspaces for complex online tasks that involved collecting and organizing information that were constantly changing in priority or relevance. They also noted the challenges with evolving tasks that were too small, ephemeral, or undeveloped to merit their own workspace, but were still important to manage and keep track of.

SUMMARY OF THE DISCLOSURE

In an implementation, the present disclosure is directed to a method of providing a user interface (UI) that operatively interfaces with content-access software to assist a user with organizing content items accessed via the content-access software. The method being performed by software providing the UI includes providing a content-item-bundle UI that allows the user to create, modify, or create and modify, content-item bundles, wherein each of the content-item bundle is configured to contain zero or more content items accessed via the content-access software and to contain relationship information that defines said each content-item bundle; storing in memory, for said each content-item bundle, the zero or more content items and the corresponding relationship information; retrieving from the memory, the relationship information and the zero or more content items for one or more content-item bundles; and using the retrieved zero or more content items and the retrieved relationship information, displaying the one or more content-item bundles to the user in a manner that visually depicts a bundled structure of the one or more retrieved content-item bundles.

In some implementations, the present disclosure is directed to software that implements methods disclosed herein.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 7A is a screenshot of a web browser having an active-tab window in which a user is in the processing of clipping information from an online resource for saving to a content-item bundle;

DETAILED DESCRIPTION

1. General

Figure 1:
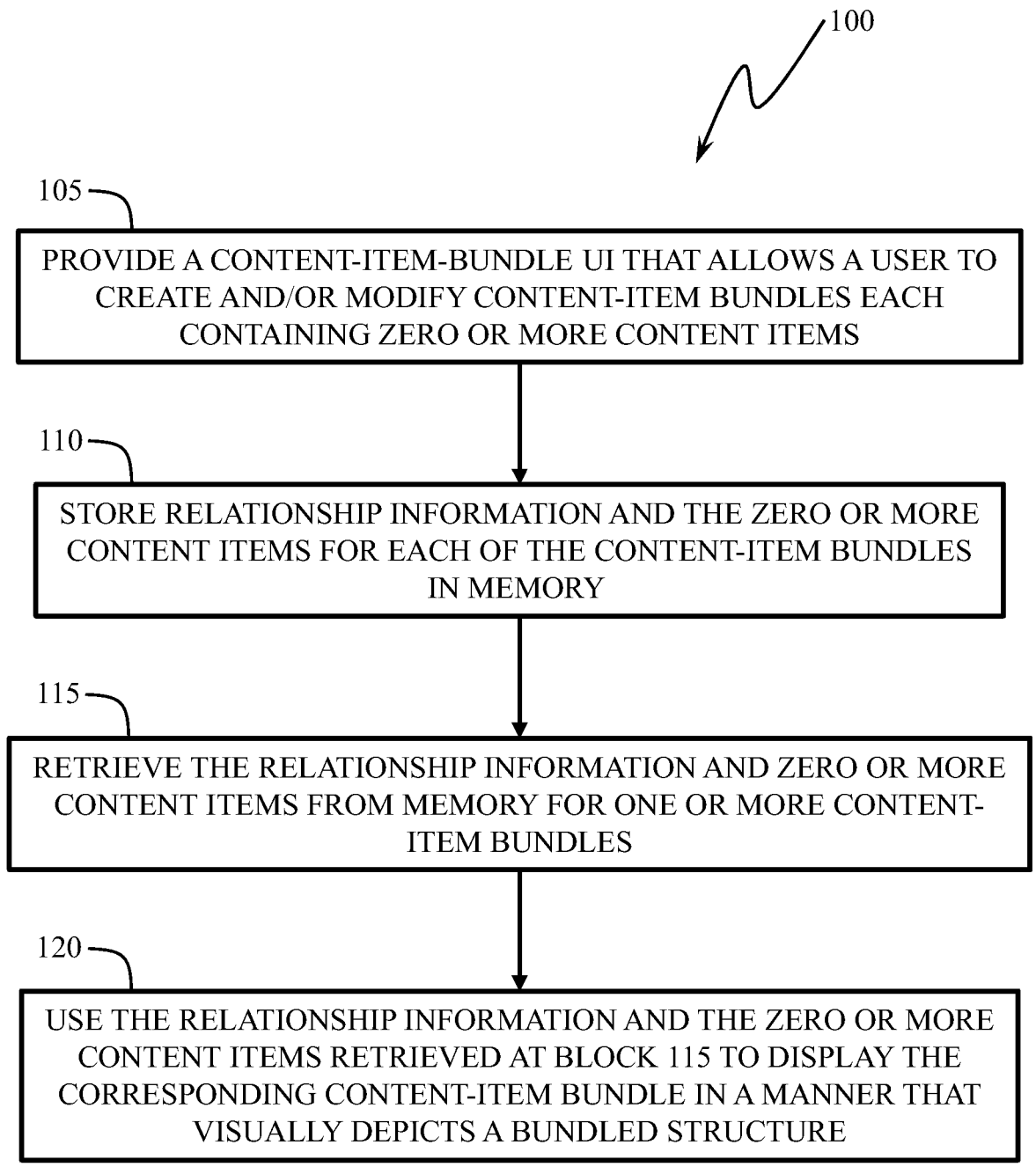
FIG. 1 is a flow diagram of an example method of providing a user interface for assisting a user with organizing content items accessed via content-access software in accordance with aspects of the present disclosure.

In some aspects, the present disclosure is directed to methods of providing user interfaces (UIs) that each operatively interface with corresponding content-access software, such as web-browser software, to assist a user with organizing content items, such as web-pages and/or portion(s) thereof, accessed via the content-access software. As discussed below, in some embodiments a content item can be any information from (e.g., copied and/or scraped text, image(s), data, etc., or combination thereof) and/or about (e.g., a storage location, such as a uniform resource locator (URL)) a resource (e.g., webpage, storage location, etc.) accessible using the content-access software. In some embodiments, the content-access software displays content items in content-item viewers, such as, for example, browser tabs (and corresponding viewing panes) and/or browser windows, among others.

In some embodiments, methods operate on a fundamental relational construct, or primitive, referred to herein and in appended claims as a "content-item bundle". A content-item bundle defines and holds zero or more relationships between/among zero or more content items. When a content-item bundle holds zero content items, it reduces to a text-only item, such as a to-do item, a reminder item, a placeholder, or the like. When a content-item bundle holds a single content item concerning a resource accessed via the content-access software, it may contain the resource-based content item, a pointer (e.g., a location in a local datastore, a URL, etc.) to the resource-based content item, or pointer (e.g., URL) to a resource containing the resource-based content item. In some embodiments, the resource-based content item may be stored in association with a bundle identifier that the content-access software displays to a use. A bundle identifier may be, for example, a descriptor provided by a user, an excerpt from the resource from which the content-item was obtained, or a URL or portion thereof, among other things, in, for example, a non-hyperlink form or a hyperlink form that hyperlinks to the content item.

When a content-item bundle holds two or more resource-based content items accessed via the content-access software, it may contain each of the content items in the same manner as a single resource-based content item as just described. In some embodiments, the content-item bundle for two or more resource-based content items may include a bundle identifier, which, similar to a bundle identifier for a content-item bundle containing a single resource-based content item, may be, for example, a descriptor provided by a user, an excerpt from the resource from which the content-item was obtained, or a URL or portion thereof, in a non-hyperlink form or in a hyperlink form that hyperlinks to one of the content items.

As a simple example of a content-item bundle containing multiple resource-based content items in the context of a web browser being the content-access software, the resource-based content items may be webpages (e.g., when first accessed via the web-based browser, appearing in separate browser tabs and/or browser windows), such as a search-engine-results webpage, one or more webpages accessed from that results webpage, and/or one or more webpages independently navigated to by the user. In one example, all of these webpages may be contained in a single content-item bundle, with the search-results webpage providing the bundle identifier (e.g., as a hyperlink that reopens that search-results page or a non-hyperlink identifier), and each of the one or more webpages accessed from that search-results webpage may have its own content-item identifier displayed in a manner that indicates that webpage's inclusion in the content-item bundle. A multi-content-item bundle of this type can be automatically created by the relevant software, for example, by automatically tracking and relating each webpage accessed via the search-results webpage to the search-results page and/or using machine-learning algorithms. That said, there are many ways that content-item bundles can be created, including the ways discussed below and provided in various examples within this disclosure, as well as ways that will be apparent to those skilled in the art after reading this disclosure.

Once created, content-item bundles can be automatically and/or manually related with one another in any one or more of a variety of ways. For example, in some embodiments a user may relate two or more content-item bundles with one another by creating a bundle collection that contains one or more individual content-item bundles. In some deployments, a bundle collection may be referred to as a "project", a "category", a "meta-task", or any other term that describes an association between the overarching relationship between/among any one or more particular content-item bundles. Each bundle collection may have a user-assigned collection identifier, such as a project name, category name, meta-task name, etc. An example of a project-based deployment of content-item bundles is described below in detail in connection with FIGS. 3-6.

As another example of how content-item bundles can be related with one another is via nesting content-item bundles with one another to create a meta-bundle of sorts, though the resulting structure may still be referred to as a "content-item bundle". A meta-style content-item bundle can have content-item bundles on one or more levels, with each level containing one or more content-item bundles. A meta-style content-item bundle may be built in any one or more of a variety of ways, either automatically or manually, or both. For example, one or more auto-bundling algorithms implementing artificial intelligence (AI) and/or machine learning techniques can be used to automatically create a meta-style content bundle. For example, an auto-bundling algorithm may track how a user opened corresponding respective resources via the content-access software (e.g., by selecting one or more hyperlinks on one or more visited webpages) and/or classify the nature of the relevant visited webpages and grouping such webpages by class and then forming a content-item bundle, which can be a meta-style content bundle depending on the relationships among the content items, via the automated tracking and/or classification by the auto-bundling algorithm.

In addition, or alternatively, to automatic bundling of content items, a user can create any content-item bundle desired. For example, the content-access software may provide an onscreen graphical UI (GUI) having an interactive workspace that allows a user to create content-item bundles and manipulate content items and content-item bundles by using, for example, any suitable conventional graphical manipulation technique(s), such as clicking and dragging (e.g., using pointing device), touching and dragging (e.g., using a touchscreen), dragging and dropping, and using arrow keys on an input device, among many others, to manipulate corresponding respective onscreen graphical elements to build (e.g., add to, subtract from, rearrange) any desired content-item bundle. In some examples, a user can move 1) any existing content item from one content-item bundle to another content-item bundle whether it is in another content-item bundle or in another location, such as a currently open content viewer list (e.g., open browser tab/browser window list, see below), 2) any existing content item from one level of a meta-style content-item bundle to another level in the same meta-style content-item bundle, 3) any existing content-item bundle from one location to another, such as from a meta-style content-item bundle to a workspace (e.g., a project workspace), from one meta-style content-item bundle to another meta-style content-item bundle, from one level within a meta-style content-item bundle to a different level within the same content-item bundle, and/or from one workspace location (e.g., a currently open content viewer list) to another workspace location (e.g., a project workspace), among others. Fundamentally, there is no limitation on the type(s) of graphical manipulation techniques that a software designer can utilize to effect the desired onscreen manipulations needed for a particular instantiation of software. In addition, those skilled in the art will readily understand how to create the necessary machine-executable instructions for implementing the selected graphical manipulation techniques using only guidance of this disclosure and knowledge in the art. Similarly, once someone skilled in the art understands this disclosure and the novel aspects, features, techniques, and software disclosed herein, they will be able to create the necessary machine-executable instructions for implementing any one or more of the methodologies disclosed herein using only knowledge known in the art.

As skilled artisans will appreciate, there are many ways to visually present one or more content-item bundles to a user. For example, content-item bundles can be visually presented in a multilevel-list format. A multi-content-item bundle may be visually displayed with the bundle identifier being on a first line, with one or more content-item identifiers located below the bundle identifier with some sort of visual cue indicating each's subordinance to the bundle identifier. Examples of such visual cues include, but are not limited to, an indentation, a different font/font size, presence of a bullet marker or bullet marker of a type different from a bullet marker used for the bundle identifier, among others. As with conventional multilevel lists, in some embodiments levels can be collapsible and expandable using collapse and expand controls, respectively. In another example, each content-item bundle or group of bundles (e.g., if multiple bundles are nested with one another) can be visually presented in a card format. For example, each highest-level content-item bundle may be displayed as its own card, with any one or more content items contained in that content-item bundle, if any, and/or any one or more lower-level content-item bundles nested with that highest level content-item bundle, if any, being displayed on the same card, for example, in a multi-level-list, among other presentation structures. Some additional examples of visual presentations for content-item bundles are described below and shown in the accompanying drawings. Those skilled in the art will understand that there are many ways to visually present content-item bundles and that it is not practical, nor necessary, to exhaustively mention or describe all of them, as they will be able to create any of these visual presentations knowing the fundamental structure of a content-item bundle and how content-item bundles can be related, or not, to one another and/or one or more projects or other higher-level functional construct(s).

As alluded to above, a content-item bundle can be associated with a higher-level functional construct, such as a project, workspace, task-board, etc. A detailed example of a project-based implementation is described below in section 2 in the context of a browser-based task manager that allows users to create projects and create, build, organize, and/or otherwise manipulate content-item bundles in a task-centric manner within each project. Of course, the uses of content-item bundles and related functionalities are not limited to such an implementation. Rather, the content-item-bundle primitive can be used in any of a wide variety of applications, as will be readily understood by those skilled in the art.

In some aspect, the present disclosure is directed to bundle-based (B-B) content-item-organization software, such as B-B content-item managers, that provide GUIs that allow users to create, modify, manipulate, associate, organize, delete, etc., content-item bundles. Typically, each B-B content-item manager is built for a specific purpose, such as to provide a B-B task manager to assist users in managing their tasks (work and/or personal), to provide a B-B task management tool, a B-B research manager, or to provide a general B-B browser-tab organizer, among other things, and any combination thereof. As those skilled in the art will readily appreciate, many types of GUIs can be built around the content-item-bundle primitive to accommodate the functionality desired for a particular application. Section 2, below, describes one example instantiation of a GUI in the context of a task-centric tab manager that allows users to manage tabs (and/or browsers windows) of web-browser software. In that instantiation, the GUI includes multiple viewing panes, or views, such as a project view, a workspace view, and an open-tab view, along with a variety of popups, menus, and/or other tools that allow a user to perform the functions they desire. Other example GUIs can likewise include multiple panes, windows, popups, etc., to enable the functionalities provided to a particular instantiation for a desired application. The number of possibilities is vast, and it is unnecessary to illustrate multiple GUI embodiments because those skilled in the art will readily understand how to implement them using the present disclosure as a guide to functionality and using, for example, conventional GUI features, elements, and tools to construct the desired GUI to suit the particular application at hand.

A B-B content-item manager of the present disclosure can be implemented in any of a variety of ways, as will become apparent from reading this entire disclosure. For example, a B-B content-item manager can be implemented as a software extension (e.g., a browser extension) or as software built into an application (e.g., a browser). FIGS. 3-6, described below in detail, illustrates features of a B-B UI 304 of a B-B task manager 300 instantiated as a web-browser extension. FIG. 2, also described in detail below, illustrates an example deployment 200 overall B-B management system of the present disclosure. Prior to describing FIGS. 2-6, however, an example method 100 of the present disclosure is described immediately below in connection with FIG. 1.

Figure 2:
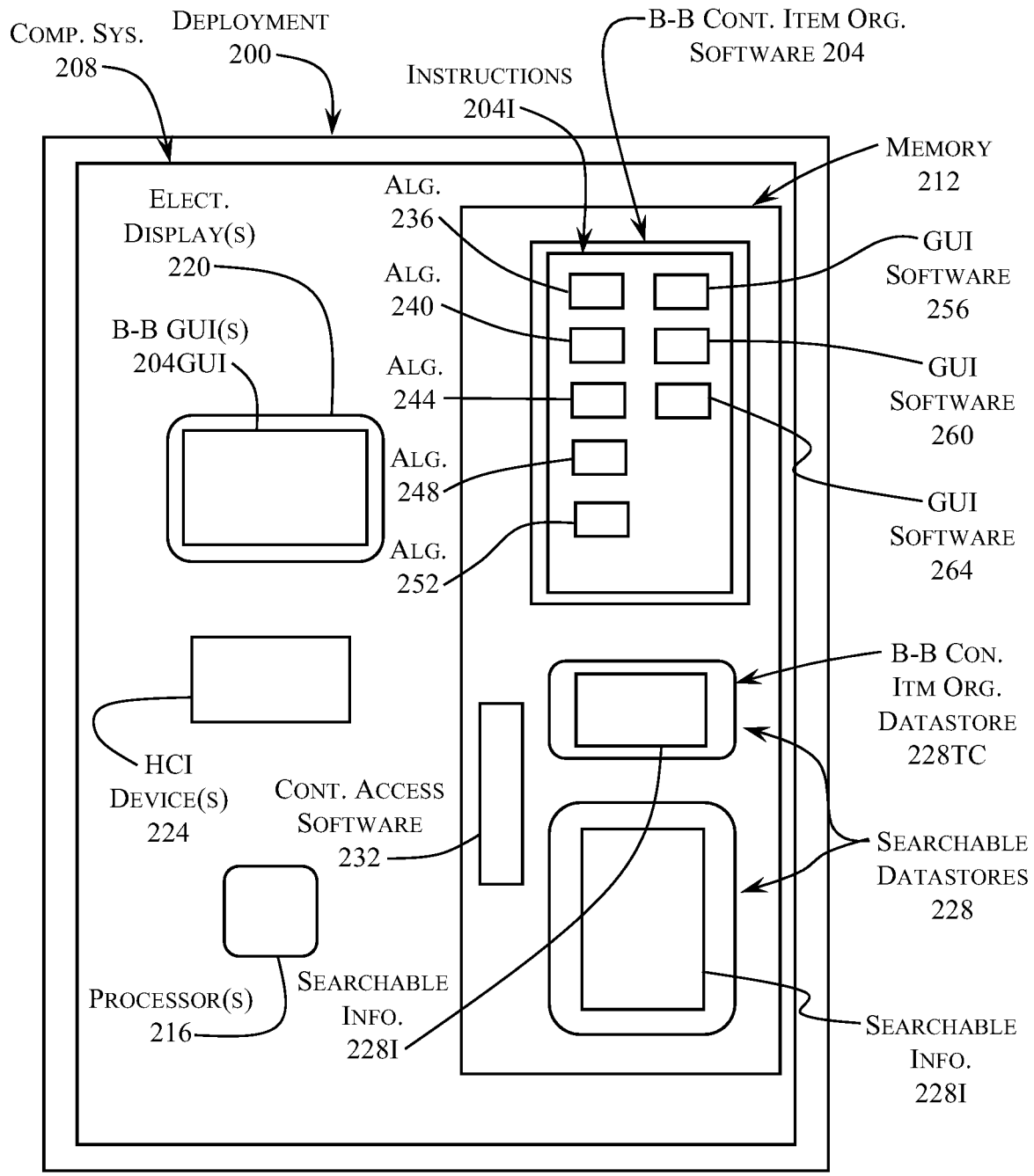
FIG. 2 is high-level diagram illustrating an example deployment of bundle-based (B-B) content-item-organization software made in accordance with aspects of the present disclosure.

Turning now to FIG. 1, in this example the method 100 is directed to providing a UI that operatively interfaces with content-access software to assist a user with organizing content items accessed via the content-access software. That said, those skilled in the art will readily appreciate that many other methods are supported by the present disclosure and that the method 100 is merely illustrative. Referring to method 100, at block 105 the method includes providing a content-item-bundle UI that allows the user to create, modify, organize, etc., content-item bundles. In this example, each content-item bundle is configured to contain zero or more content items accessed via the content access software and to contain relationship information that defines each content item bundle. Such relationship information may include, for example, a bundle indicator (e.g., table entry) for each content item that the content item belongs to a particular bundle, and, in some embodiments, a bundle-level indicator (e.g., table entry) for each content item that indicates the level of a multilevel (e.g., hierarchical) content-item bundle on which that content item resides, among others, and any combination thereof.

At block 110, the zero or more content items and the corresponding relationship information for each content-item bundle are stored in memory. As discussed below, the memory can be any one or more types of memory. The zero or more content items can be stored in any suitable manner, including using tables and pointers that point to separate storage locations, among others. Similarly, the relationship information can be stored in a suitable manner, such as in one or more tables or other datastore structure. Fundamentally, there are no limitations on the manner(s) in which the content items and relationship information are stored as long they are stored in a manner compatible with the content-item-bundle primitive upon which each content-item bundle is based.

At block 115, the relationship information and zero or more content items are retrieved from the memory for one or more of the content-item bundles contained in the memory. As those skilled in the art will readily appreciate, the manner of retrieval will be based on the way(s) that the relationship information and zero or more content items are stored. Because of the ubiquitous nature of various storage and retrieval methods and schemes known in the art and/or usable herewith, it is not necessary to provide any detailed examples. Any suitable storage and retrieve methods and schemes, including conventional storage and retrieval methods and schemes can be used.

At block 120, the relationship information and zero or more content items retrieved at block 115 are used to display the corresponding one or more content-item bundles in a manner that visually depicts a bundled structure of the one or more content-item bundles. For example, the displaying at block 120 may involve using the relationship information for each content-item bundle to determine the visual arrangement of the one or more content items, i.e., the bundled structure, on the display. For example, if the relationship information of a particular content-item bundle indicates that the bundle contains multiple content items, then the content items may be displayed so that it is visually clear to the user that those content items belong to the same bundle. As simple examples, the content items may be displayed in a common bounding box, displayed at a common indent-level of an indent-style list, etc. Those skilled in the art will readily appreciate the myriad of ways that membership in a content-item bundle can be visually portrayed, such that exhaustive examples are not needed for skilled artisans to implement the method 100 and related methods to their fullest scope without undue experimentation. As another simple example, if the relationship information indicates that multiple content items reside on differing levels of a multilevel content-item bundle, then the content items may be displayed in an indent-style list at differing indent amounts based on which level each is on. Of course, many other ways exist for presenting content items so that their differing levels are visually apparent, and it is not necessary to provide exhaustive examples for skilled artisans to implement the method 100 and related methods to their fullest scope without undue experimentation.

It should be understood that the various features and elements of the method 100 can take the form of any of the corresponding features and elements described and illustrated generally above and/or described and illustrated in the specific example below in section 2.

As noted above, FIG. 2 illustrates an example deployment 200 of B-B content-item-organization software 204 made in accordance with aspects of the present invention. The B-B content-item-organization software 204 can be configured to perform the method 100 of FIG. 1, among many other methods disclosed herein either explicitly or implicitly. Referring to FIG. 2, in the example deployment 200 B-B, the content-item-organization software 204 may include any or all of the functionalities described in this disclosure. It is emphasized that the deployment 200 is merely illustrative and that there are many other deployments, such as deployments provided in other hardware environments (e.g., device based, network based, cloud-computing based, multiuser based, single-user based, etc., environments, and any logical combination thereof). Those skilled in the art will readily understand how to not only configure the B-B content-item-organization software 204 for use in any type of hardware environment but will also understand how to effect deployment of the software to the target environment. In addition, it is noted that while the B-B content-item-organization software 204 is referred to as a unitary piece of software, this is not to imply that the software cannot be deployed as pieces of software (e.g., modules, components, etc.) that are separate and distinct from one another and/or deployed at differing hardware locations. On the contrary, the term "B-B content-item-organization software" is used for convenience only to agglomerate various functionalities with one another. Indeed, those skilled in the art will readily appreciate that in many hardware environments the B-B content-item-organization software 204 will have differing components at differing hardware locations. For example, some components may reside on local devices (e.g., laptop computer, desktop computer, smartphone, etc.) and some components may reside at one or more other locations, such as in a computing cloud.

In the example of FIG. 2, the deployment 200 includes a computer system 208 that executes the computer-executable instructions 204I contained in the B-B content-item-organization software 204. As noted above, the computer system 208 may take any of many differing forms, ranging from a standalone computer system, such as a desktop computer, laptop computer, tablet computer, smartphone, smartwatch, etc., to a LAN-based computer system to a WAN- or global-area-network-based computer system, such as an Internet-based computer system, with local and/or distributed computing functionality. Computer system 208 includes memory 212 that stores, among other things, computer-executable instructions 204I, and one or more processors 216 that execute, among other things, such computer-executable instructions. For the sake of convenience because of the multitude of forms of memory used in computer systems, the memory 212 collectively represents any and all types of machine memory (i.e., not transitory signals) used by the processor(s) 216 and the computer system 208 more generally, to carry out all functionality of the computer system. Consequently, the memory 212 may include any one or more forms of non-volatile memory (e.g., non-volatile storage memory and non-volatile memory, including non-volatile main memory) and/or any one or more forms of volatile memory (e.g., static random-access memory (RAM), dynamic RAM, etc.), among others. Fundamentally, there is no limitation on the type of machine memory that can be used as or be part of the memory 212.

The deployment 200 includes one or more electronic displays 220 (only one shown for convenience) each for displaying one or more GUIs (not shown) and/or portion(s) thereof of the B-B content-item-organization software 204. Each electronic display 220 may be based on any suitable display technology, such as LED, LCD, or plasma, augmented reality, etc., among others, and any combination thereof. Fundamentally, there is no limitation on the type of each electronic display 220 as long as it allows a user to view the appropriate B-B GUI(s) or portion(s) thereof (collectively illustrated at element 204GUI on the electronic display 220), including any image(s) displayed thereby. It is noted that in the appended claims, the use of the term "electronic display" denotes not only a single display, but also multiple displays that a user may use to view any one or more GUIs of the B-B content-item-organization software 204. This is in recognition of current common practices of using multiple electronic displays (e.g., computer monitors) at a single workstation and of using large mosaicked displays made of multiple display tiles. Any one or more of the electronic displays 220 may be touchscreen enabled using any suitable touchscreen technology. Such touchscreen technology may be used as a human-computer interaction (HCI) interface for the B-B content-item-organization software 204 to allow the user to interact with the software using suitable gesturing. Each electronic display 220 may be associated with one or more HCI devices 224 other than a touchscreen, such as a computer mouse, a trackball, a tablet-input device, etc., among others.

In this example, the deployment 200 includes one or more searchable datastores 228 each containing information that can be searched via one or more instances of the content-access software 232, such as web-browsing software. For the sake of this disclosure, each searchable datastore 228 may be considered as containing or potentially containing at least one item of searchable information 228I that any one or more instances of the content-access software 232 may return as a result of a search initiated by a user. As alluded to above, searchable information 228I may take any of a variety of forms depending on the type of the corresponding datastore(s) 228 and/or context of deployment. Examples of datastores 228 range from information contained in non-volatile memory (e.g., a hard drive) of a computing device, to one or more databases contained on one or more computing devices, such as one or more databases stored on a mainframe computer, a web server, a web server farm, among others, and any combination thereof, to one or more B-B content-item-organization datastores, such as one or more B-B content-item-organization datastores 228TC that store data that underlies the various functionalities of the B-B content-item-organization software 204. Regarding the one or more instances of the content-access software 232, each instance may be any of a variety of types, such as the types described above, which include but are not limited to a web browser, a datastore frontend, or an information-retrieval app, among others.

In the example deployment 200, the B-B content-item-organization software 204 is configured to execute any one or more of a variety of algorithms that perform the corresponding respective functionalities described above, depending on the nature of the deployment. Examples of algorithms encoded into the B-B content-item-organization software 204 include: one or more user-interaction tracking (e.g., reading-progress-tracking) algorithms 236 that track each user's interaction with search-result items, one or more user-interaction visualization algorithms 240 that visualize tracked user interactions, one or more auto-bundling algorithms 244 that provide automatic content-item-bundling functionalities, one or more interactive-workspace algorithms 248 that provide interactive-workspace functionalities (other than user-interaction tracking), and one or more sharing algorithms 252 that allow multiple users to share content-item bundles, projects, interactive workspaces, and/or content items, among other things, across multiple computer devices and/or user accounts and to interact with content-item bundles, projects, interactive workspaces, and/or search-results items, among other things, shared by other users, among others.

In the example deployment 200, the B-B content-item-organization software 204 is also configured to include a variety of GUI software that allows a user to interact with various functionalities of the B-B content-item-organization software. Examples of GUI software that the B-B content-item-organization software 204 includes, but are not limited to are B-B GUI software 256 that displays content-item bundles, projects, task, and related features (see, e.g., features mentioned above and described below in connection with the example B-B task manager 300 of FIGS. 3-6), and allows one or more users to interact therewith, and content-item-bundle, task, and/or project creation GUI software 260 that allows a user to create content-item-bundles, tasks, and/or projects, and group-share GUI software 264 that provides user-functionalities for group sharing of and/or group interaction with content-item bundles, tasks, projects, interactive workspaces, and/or content items, among other things.

As those skilled in the art will readily appreciate, the foregoing example algorithms 236, 240, 244, 248, and 252 and GUI software 256, 260, and 264 of the B-B content-item-organization software 204 interact with various physical components of the deployment 200, such as the memory 212, processor(s) 216, the electronic display(s) 220, and the HCI device(s) 224, as well as any one or more of the searchable datastore(s) 228, the B-B content-item-organization datastore(s) 228TC, and any other datastores (not illustrated) using known computer-programming techniques to create corresponding computer-executable instructions that need not be elaborated upon here for those skilled in the art to understand how to implement the many novel features, aspects, and functionalities disclosed herein.

2. Example Instantiation: Task-Centric Browser-Tab Manager

There are many applications for the basic content-item-bundle construct, or primitive, such as a tool to assist a user in managing tasks that require one or more users (one user described hereinafter for convenience) to access multiple resources in the course of the user performing a project or other task. This example introduces a task-centric approach to managing web-browser tabs and/or web-browser windows (collectively referred to as "tabs" below for ease of presentation) that bridges the gap between managing individual browser tabs and managing users' online tasks and subtasks. Task-centric approaches have been shown to work well for domains such as file systems, application windows and email. However, while browsing, a user is often exploring and sampling content items from a nearly infinite set of resources for a myriad of purposes, leading to tasks that are often more ad hoc, uncertain, and ephemeral than traditional projects and desktop applications that prior systems have targeted. To address these challenges and referring to FIG. 3, a task-centric tabbed browsing approach can be implemented in a content-item-bundle based, or bundle-based (B-B), task manager 300 instantiated via a browser extension that provides a main B-B UI 304 for interfacing with the corresponding browser, here, via a browser-tab window 308. That said and as noted above, the same or similar B-B task manager 300 can be instantiated in another form, such as by full integration of the B-B UI 304 into a browser app, among others. In addition, and as also noted above, the same or similar B-B task manager 300 can be deployed in connection with a type of content-access software other than a web-based browser.

2.1 Example User Experience

The following example scenario is used herein to illustrate the example B-B task manager 300. After reviewing this scenario and the functionalities of the B-B task manager described in connection therewith, those skilled in the art will readily appreciate the wide applicability of the B-B task manager to many different and diverse scenarios. Turning to the example scenario, consider a university student who has been considering taking a vacation somewhere in Europe. She casually searches using a general web-search engine for "things to do in Spain", and opens a few webpages in corresponding tabs.

It quickly becomes apparent to the user that she is most interested in two cities—Barcelona and Madrid. She starts to wonder about their lodging choices, so she creates two new general web searches for "Hotels in Barcelona" and "Hotels in Madrid" and opens, in differing tabs, a few hotel websites (not shown) from each search-results page (not shown). At this point, she has accumulated more than 15 tabs (only some shown as noted) from the three searches and from opening more links into tabs as she read some of the webpages, and what started as a casual exploration to pass the time has quickly grown into a more intensive research session. She feels overwhelmed by her open tabs and cannot easily switch focus between her tabs for researching hotels in the two cities and her tabs for researching things to do in Spain.

Figure 3:
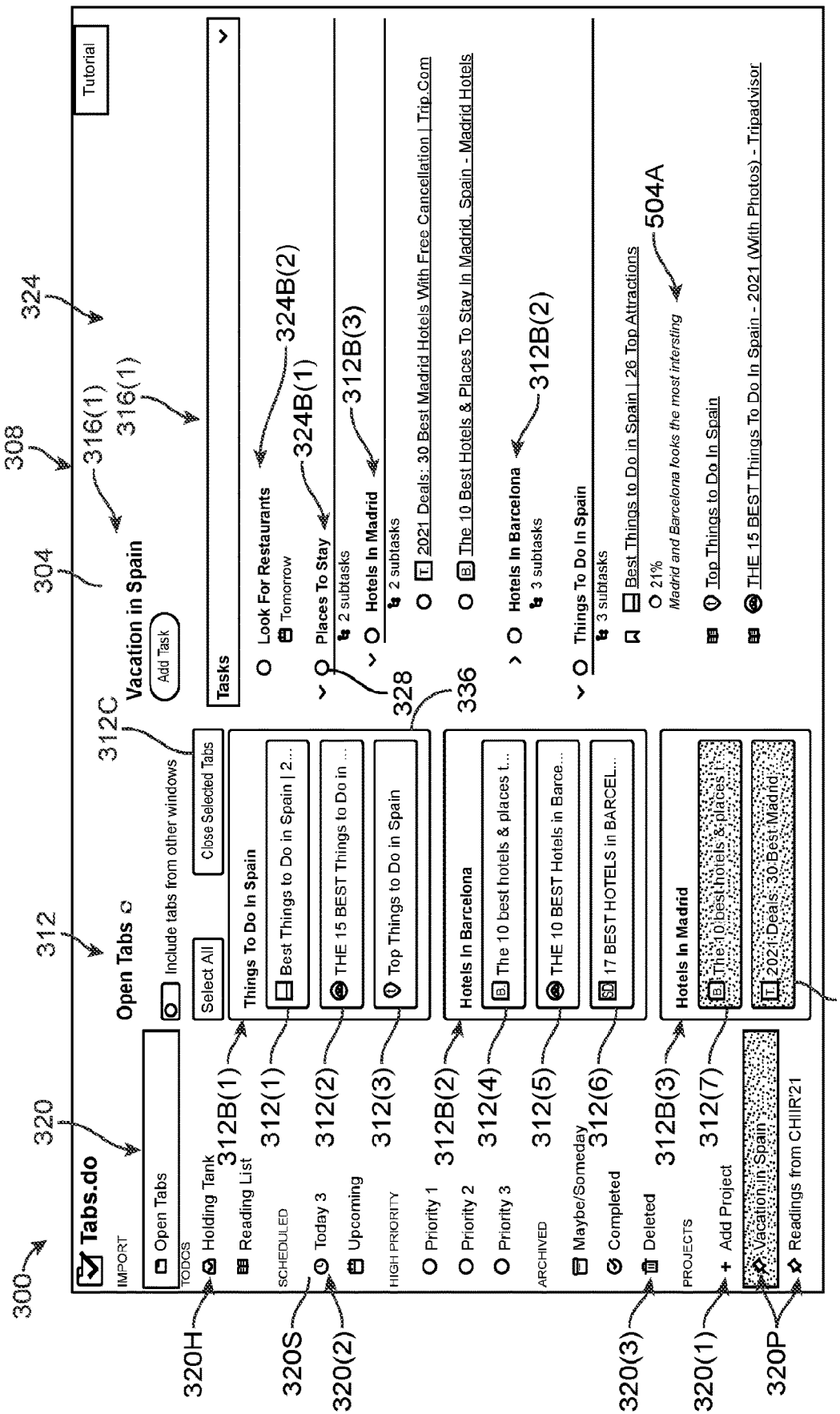
FIG. 3 is a screenshot of an example B-B user interface (UI) of a B-B task manager made in accordance with the present disclosure.

After conducting the above-described searches and opening various webpages, the user now opens the B-B task manager 300 of FIG. 3 and finds her open tabs, eight tabs 312(1) to 312(8) of which are visible in FIG. 3, automatically grouped into three suggested content-item bundles 312B(1) to 312B(3) in an open-tabs region 312 (more generally, an "open-viewers region"). It is noted that while the tabs 312(1) to 312(8) illustrated in FIG. 3 and other figures herein are referred to as "tabs", they are, of course, not the actual content-viewers (e.g., browser tabs or browser windows) of the browser software (not shown). Rather, the corresponding text and links represent the actual content-viewer windows. Specifically, in the open-tabs region 312, the tabs represented there (e.g., tabs 312(1) to 312(8) are content-viewers that are currently open in the browser software.

In this example, the B-B task manager 300 includes auto-bundling algorithms (not shown) that have automatically bundled tabs 312(1) to 312(3) into a corresponding content-item bundle 312B(1), automatically bundled tabs 312(4) to 312(6) into a corresponding content-item bundle 312B(2), and automatically bundled tabs 312(7) and 312(8) into a corresponding content-item bundle 312B(3). Here, the auto-bundling algorithms have not included the original search tabs in the content-item bundles 312B(1) to 312B(3). Rather, the auto-bundling algorithms have used the search queries "Things to do in Spain", "Hotels in Barcelona", and "Hotels in Madrid" as the corresponding respective content-item-bundle identifiers. In other embodiments, the search-query tab itself may be part of the content-item bundle 312B(1), such as by making the search query an active hyperlink to the search results page.

To start a new workspace for them, she uses an "Add Project" control 320(1) in an overview region 320 to create a new project 316(1) in the B-B task manager 300 titled "Vacation in Spain". To save desired ones of her open tabs, including tabs 312(1) to 312(8), in an organized way, she can, for example, drag one or more of the content-item bundles 312B(1) to 312B(3) and/or one or more individual tabs, as desired and drop them into a project-view region 324. In the example shown, the user has dragged and dropped each of the three content-item bundles 312B(1) to 312B(3) into the new "Vacation in Spain" project 316(1), which is open in the project-view region 324. As a result, these three content-item bundles 312B(1) to 312B(3) also appear in the project-view region 324 as part of the "Vacations in Spain" project 316(1). To further organize her tasks, she creates an empty content-item bundle 324B(1) titled "Places to Stay" and nests her two hotel content-item bundles 312B(2) and 312B(3) under it in the project-view region 324. This creates a hierarchical-type content-item bundle. She then creates another empty content-item bundle, specifically a "Look For Restaurants" content-item bundle 324B(2), which is also a task, and two unseen content-item bundles titled "Restaurants in Madrid" and "Restaurants in Barcelona", respectively, nesting the later two under the "Look For Restaurants" content-item bundle via drag and drop (FIG. 4) as reminders for what she needs to research next. In this example, the user has scheduled the "Look For Restaurants" task 324B(2) for "Tomorrow".

Figure 4:
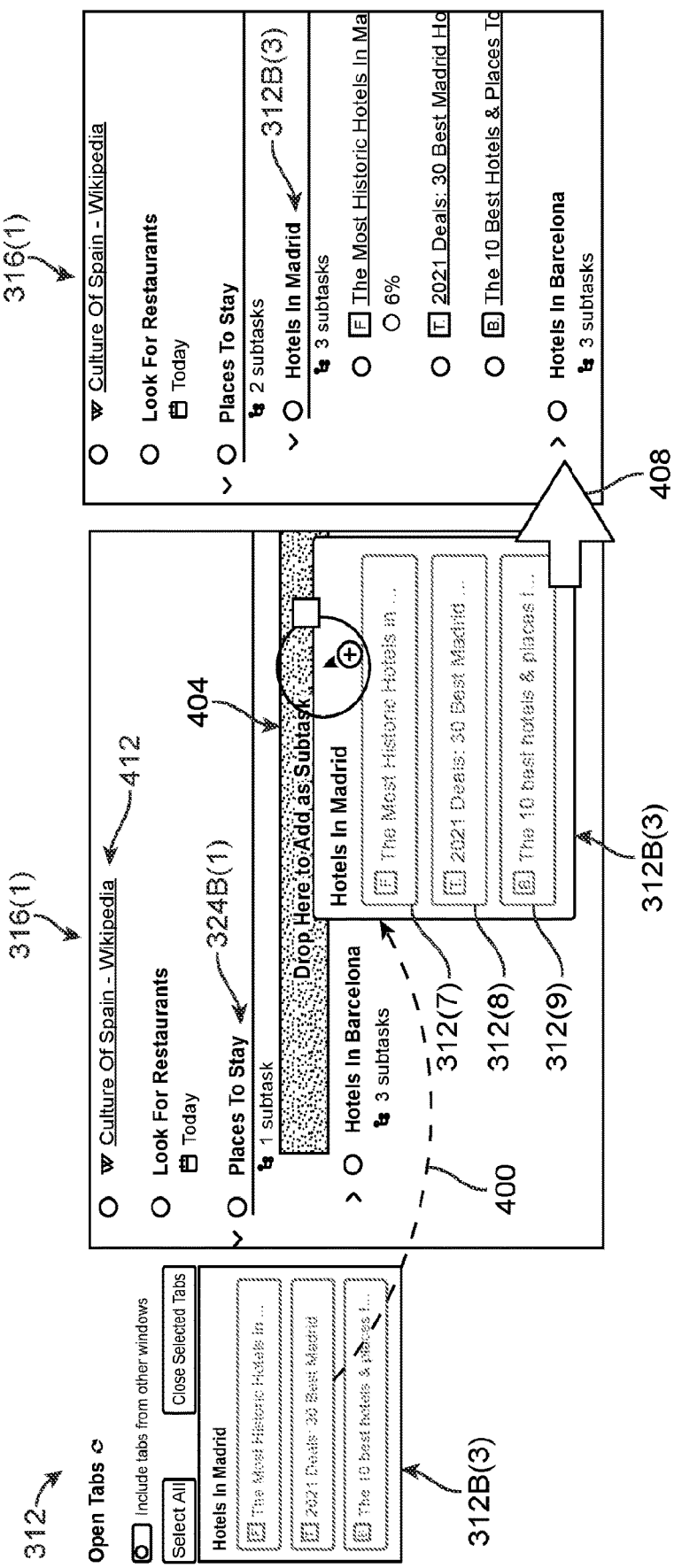
FIG. 4 is a diagram illustrating a drag-and-drop operation performed on a content-item bundle of the B-B UI of FIG. 3.
Figure 5:
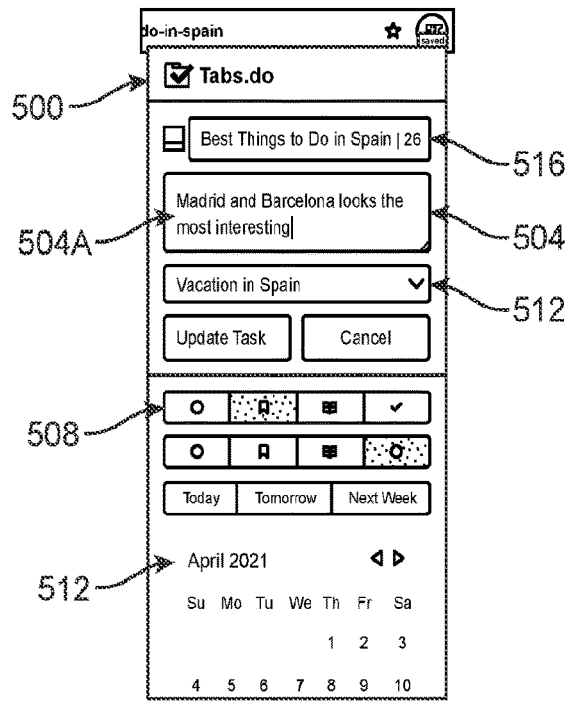
FIG. 5 is a screenshot of a popup window of the B-B task manager of FIG. 3, illustrating features of the popup window.

FIG. 4 illustrates an example of building tasks with a project, here, the "Vacation in Spain" project 316(1) of FIG. 3. Referring to FIG. 4, to add the full "Hotels in Madrid" content-item bundle 312B(3) to the "Vacation in Spain" project 316(1), the user drags and drops (dashed arrow 400) the "Hotels in Madrid" content-item bundle from the open-tabs region 312 to a "Drop Here to Add Subtask" control 404, which here is located within the "Places to Stay" content-item bundle 324B(1). The result of this drag-and-drop operation on the structure of the project 316(1) is illustrated to the right of arrow 408, with the "Hotels in Madrid" content-item bundle 312B(3) now being a subtask under the "Places to Stay" content-item bundle 324B(1). In this example, while dragging, the light-shaded background indicates the selected tabs 312(7) to 312(9) that are being dragged, and the dark-shaded background of the "Drop Here to Add Subtask" control 404 indicates where the user can drop the selected tabs. Of course, other manipulation techniques can be implemented as desired.

Referring again to FIG. 3, to continue her research she closes some of her open tabs, here, open tabs 312(4) to 312(8), for researching hotels with three clicks in the open-tabs region 312 to first select the two content-item bundles 312B(2) and 312B(3) for, respectively, "Hotels in Barcelona" and "Hotels in Madrid" and then use a "Close Selected Tabs" control 312C to close them. At this point, all of her open tabs are about things to do in Spain again (i.e., via the "Things To Do in Spain" content-item bundle 312B(1)), as she switches her focus back to her initial subtask. Moving content-item bundles, such as the content-item bundles 312B(1) to 312B(3), and/or open tabs, such as open tabs 312(1) to 312(8), from the open-tabs region 312 to the project-view region 324 and creating new content-item bundles, such as content-item bundles 324B(1) and 324B(2), in the project-view region saves them to memory (not shown) attendant the B-B task manager 300. When the content items are presented as hyperlinks in the project-view region 324, the user may select each hyperlink to access the content item. For example, if the content item is a webpage, selecting a hyperlink in this manner may open a new browser tab (not shown) that displays the webpage. Because the tabs appearing in the project-view region 324 are effectively saved to memory, the user can close any corresponding open tabs shown in the open-tabs region 312.

As the user continues to read from the webpages, she decides to open a popup window 500 (FIG. 5) of the B-B task manager 300 (FIG. 3) to save, in a notes field 504, notes 504A from the webpage she is reading. When she returns to her "Vacation in Spain" project 316(1) in the B-B task manager 300 (FIG. 3), she can see an overview of all the notes she took on the individual tabs. See, for example, the occurrence of the notes 504A in the project-view region 324 of FIG. 3. After a while, she notices in the B-B task manager 300 that there are three tasks for a class assignment due today as indicated by the "3" located next to a "Today" control 320(2) in the B-B task manager 300 (FIG. 3). She decides she should work on her assignment, so she closes all her tabs for Spain vacation research, feeling confident knowing that she can resume her research progress any time by reopening her "Vacation in Spain" project 316(1) and that the B-B task manager 300 will restore all of her notes and scroll positions. Finally in this example, she navigates to another task 600 (FIG. 6) she had previously created for the class and uses an open-task-tabs control 604 to reopen its content-item bundles (not shown) back into open tabs, which in this example includes presentation slides, her notes on a separate app, such as Google Docs™, and the link to the homework instructions to start working on her homework.

A basic intuition behind the example B-B task manager 300 is that tabs, e.g., tabs 312(1) to 312(9) (FIGS. 3 and 4) and/or the corresponding genesis search-type tabs (not shown), which displayed the search results originally containing the links to the tabs 312(1) to 312(9) the user opened during her research, can be "bundled" together into the corresponding content-item bundles, such as content-item bundles 312B(1) to 312B(3) (FIG. 3), using the above-described content-item-bundle primitive while also being treated as tasks. Regarding the task aspect, the B-B task manager 300 can provide a host of task-management functionality, such as reminding, prioritizing, complex structuring, task switching, and supporting tasks both early and late in maturity. In some embodiments, such as the example B-B task manager 300, to further lower the friction of importing open tabs, such as tabs 312(1) to 312(9) (FIGS. 3 and 4), a B-B task manager of the present disclosure can use auto-bundling algorithms (not shown) to make predictions about which open tabs correspond to the same tasks by exploiting behavioral and semantic features, thereby allowing users to, for example, drag and drop groups of tabs into the system to create pre-labeled, bundled tasks as content-item bundles. In the example shown in FIG. 3, the auto-bundling algorithms have automatically grouped tabs 312(1) to 312(8) (312(9) is shown in FIG. 4) into content-item bundles 312B(1) to 312B(3). In some embodiments, to protect users' privacy, the auto-bundling algorithms run locally inside each user's browser so that the B-B task manager does not transmit information about users' open tabs before they explicitly save their tabs into the B-B task manager.

The B-B task manager 300 instantiates its task-centric approach through providing a set of task-management affordances that help users manage a variety of browsing tasks. In this example, the B-B task manager 300 enables users to create complex task structures by grouping and nesting tabs via the content-item bundle primitive and project organization. In the example shown, the B-B task manager 300 allows a user to fluidly suspend and relaunch tasks to reduce tab clutter, reduce friction through automatic task suggestions, while also helping the user to manage attention through task prioritization, scheduling, and a variety of task types and statuses.

The example B-B task manager 300 of FIG. 3 leverages the observation that users often open multiple tabs to support the same task and provides mechanisms for users to group them together as content-item bundles. Recently, U.S. Pat. No. 11,294,984 issued on Apr. 5, 2022, to Kittur et al. and titled "METHODS OF PROVIDING A SEARCH-ECOSYSTEM USER INTERFACE FOR SEARCHING INFORMATION USING A SOFTWARE-BASED SEARCH TOOL AND SOFTWARE FOR SAME", explored a search-centric mobile browser that scaffolds users' search tasks by treating all search results as opened or unopened tabs. In the present disclosure, users' search activities are also exploited to scaffold their task structures. However, instead of forcing tabs opened from a search-results page to be grouped together, some embodiments of the example B-B task manager 300 use auto-bundling algorithms that consider search activities and other behavioral and semantic features at the same time to produce tab-grouping, i.e., content-item-bundling, suggestions. This allows such embodiments to produce grouping suggestions for tabs not opened from search results and allows users to make adjustments to the grouping suggestions to better fit their mental models and correct mistakes that the auto-bundling algorithms may make. In addition, or alternatively, to auto-bundling, a user can manually choose which tabs to bundle together. In some embodiments, a user can add tabs opened from other search-results pages and/or other sources (e.g., by directly typing a URL into a browser's URL field, opening from a social-media feed, etc.) to the same or any other desired content-item bundle.

2.2 Fundamental Primitives and Design

As noted above, the fundamental primitive that the example B-B task manager 300 of FIG. 3 utilizes to support the above design goals is the content-item bundle. Following the description of content-item bundles presented above in section 1, each content-item bundle of the example B-B task manager can hold zero or more tabs (clips and/or other type of content item) and zero or more content-item bundles, which can be nested to an arbitrary level of depth, and can be created, for example, via dragging and dropping (see, e.g., FIG. 4) or other graphical manipulation technique. If empty, a content-item bundle consists only of a text title, which essentially acts as a to-do item as found in a typical to-do manager (see, e.g., FIG. 4, at content-item bundle 324B(1) that is text only).

Non-empty content-item bundles can have a variety of task functionalities, as well. When containing one tab, the content-item bundle may be displayed and act like a single tab (see, e.g., FIG. 4, at content-item bundle 412 that is a URL link), though it supports the same set of task functionality as when it is shown as a to-do item, such as in the text-only content-item bundle 324B(1). A content-item bundle can become particularly useful when it contains multiple tabs (see, e.g., content-item bundle 312B(3)), at which point the entire content-item bundle can be treated as a single task, and can be assigned a priority (see, e.g., priority-icon-selection region 508 of FIG. 5), scheduled (see, e.g., calendaring and scheduling region 512 of FIG. 5), moved into a project (see, e.g., project 316(1) of FIG. 3), or otherwise managed as a task. Furthermore, content-item bundles can be nested in/with other content-item bundles to an arbitrary level (see, e.g., project-view region 324 of FIG. 3) to create a meta-style content-item bundle, which supports complex tasks and subtask structures.

There are several common user patterns that the example B-B task manager 300 of FIG. 3 supports for transforming tabs into tasks and managing them using content-item bundles. One approach is post-hoc task management, in which a user has already started a task through a search query and may have several tabs opened from that query or related pages. In this case, a user can open the B-B task manager 300 by opening a new tab page (see, e.g., FIG. 3), selecting the tabs they wish to bundle from the open-tabs region 312 (which the B-B task manager can auto-suggest in some embodiments, as noted above and described below in detail), and dragging and dropping them into another region, such as the project-view region 324. At this point, the B-B task manager 300 creates a content-item bundle for the tabs and names the content-item bundle with a bundle identifier, for example, using the terms of the search query it originated from, if available, or else the title of the first tab in the content-item bundle. The user can then close the related tabs, while managing the task through the content-item bundle's task functionality or resuming the bundled task when they wish.

Another common approach discussed in the literature is a priori task management, in which a user creates a placeholder for a task, for example, a to-do item, that they wish to complete later, potentially scaffolding that placeholder with multiple subtasks (e.g., creating a task for a trip to Barcelona, along with subtasks for restaurants, shopping, sights, and transportation). This approach is typical of standard to-do lists, in which users queue up the tasks they need to work on and use the list as a reminder. In the case of the example B-B task manager 300, a user can add a manual task to the system (see, e.g., text-only content-item bundle 412 of FIG. 4) by creating a zero-tab content-item bundle and giving it a title, i.e., a bundle identifier, in the same way as they would a to-do item so as to similarly serve as a reminder and be scheduled, prioritized, etc. (In the illustrated instantiation, by default, the B-B task manager 300 also adds a circle (e.g., circle 328 of FIG. 3) to the left of each item modeled after typical to-do list systems, which the user can use to check off and complete the item, or change it into another item type as described below). When the user decides to work on the task, they can add any relevant tabs under the to-do item by dragging them into the zero-tab content-item bundle so as to make that content-item bundle into a non-empty content-item bundle.

In a further approach, a user can simply add a single tab (technically, a degenerate content-item bundle containing only one tab) by dragging it out of the open-tabs region 312 (FIG. 3), at which point it appears as an item representing that tab, including the title and the favicon (or tab icon) of that tab, but supporting the same functionality as any other content-item bundle.

2.3 Task-Centric Context Switching

As reflected in the example above, users often manage their attention at the task level and need support when switching focus between sets of tabs supporting their different tasks and subtasks—for example, switching from one set of tabs about hotels in Barcelona to another set about hotels in Madrid. The example B-B task manager 300 of FIG. 3, or, more generally, a content-item-bundle-based content-item management system of the present disclosure, can support this by allowing users to, for example, group tabs and save them as a content-item bundle. In the context of the example B-B task manager 300, to do so, users can click and select a set of open tabs, for example, tabs 312(1) to 312(8) listed in the open-tabs region 312 (FIG. 3), and use, for example, drag-and-drop manipulation to save them into a holding area, for example, a project they had previously created or a new project. On creation, in the example instantiation, the B-B task manager 300 automatically generates a suggested bundle identifier, which a user can edit as desired, for the content-item bundle so that it is easier to recognize in the future (e.g., "Hotels in Barcelona"). After creating a content-item bundle, a user could use the "Close Selected Tabs" control 312C to close the set of tabs, if desired. Creating content-item bundles in the example B-B task manager 300 enables the user to pause and resume progress at the task level. To resume a previously closed task, the user can reopen tabs under a content-item bundle, for example, using the open-task-tabs control 604 (FIG. 6) that the B-B task manager 300 displays upon hovering, either in the current browser (tab) window or in a newly created browser (tab) window. The example B-B task manager 300 can automatically restore each tab's scroll positions so that users can more easily resume their progress.

2.4 Automatic Bundling

A challenge to browser users is the cost of sifting through open tabs to group all relevant tabs and naming them afterward, especially for users that keep a large number of tabs open. To lower the interaction and cognitive costs of this process, the present instantiation of the B-B task manager 300 uses auto-bundling algorithms to make tab grouping, i.e., content-item bundling, suggestions. In the example shown, the B-B task manager 300 denotes automatic bundling in the open-tabs region 312, by showing, for example, a border, such as border 336 around the suggested bundle identifier (e.g., "Things To Do in Spain" for content-item bundle 312B(1)) and the corresponding set of tabs 312(1) to 312(3). Those skilled in the art will understand that the automatic groupings can be visually indicated in a variety of ways, and that displaying a border is merely an example. In the illustrated instantiation, a user can save a suggested content-item bundle using its bundle identifier as a handle for dragging and dropping the content-item bundle into the project-view region 324 as described above. Alternatively in this example, before dragging, the user can click on the bundle identifier to select and/or deselect individual tabs in the suggested content-item bundle, allowing the user to fix any mistakes made by the auto-bundling algorithms. The automatic bundling lowers the interaction costs of creating tasks, as well as giving the user a better overview of their open tabs even before saving them.

In the present instantiation, to generate bundling predictions about which tabs might belong in the same content-item bundle, a supervised neural network model (not shown) was trained using labeled browsing history. The TENSORFLOW®-JS machine-learning toolset, available from Google, LLC, was used as the machine learning library and allowed for distributing the trained model with the browser extension to make task predictions inside the browser. This design has the benefit of allowing the B-B task manager 300 to make predictions about open tabs without having to transmit browsing history to a remote server (not shown), as the browsing history may contain sensitive personal information. Detailed descriptions of the example dataset, the task prediction model, and its accuracy are provided below in section 2.7.

2.5 Task Mental Models

While tabs are typically instantiated as a linear, temporally ordered list, users' task structures are often more complex. In the example user's scenario above, a vacation to Spain had several subtasks, including researching places to stay and places to eat in both Madrid and Barcelona (see, e.g., FIG. 3). To support this task structure in this instantiation, content-item bundles can be nested within other content-item bundles by dragging and dropping them (see, e.g., FIG. 4), acting as subtasks that can be expanded and collapsed and given differing priority levels, notes, and/or other task functions. Nesting can be done to arbitrary levels of depth; to address issues with real-estate and visual clutter at high levels of depth, the example B-B task manager 300 (FIG. 3) provides a "focus" button (not shown). The focus button takes the content-item bundle that is selected and hides the content-item bundle(s) above it in the hierarchy so as to visually "focus" the B-B UI 304 on that content-item bundle and its children and maximize the screen real estate used to display it. In an example, a "breadcrumb" focus button located at the top of the screen allows the user to exit the focused view and see the parent items again.

Another challenge with task structure is supporting differing types of projects and projects at differing stages of progress. One common task type involves the long-term collection, organization, and re-access of content, such as collecting content relevant to, for example, a field of scientific study, a kitchen remodel, a design mood board, a course being taught, or a term project for a course, among many others. To support such tasks, the example B-B task manager 300 (FIG. 3) allows users to identify content-item bundles as long-term projects and have a privileged position in the overview region 320, such as by pinning them as indicated by pin icons 320P. Such projects are a familiar metaphor and correspond to the use of workspaces in conventional tab manager tools, such as the WORKONA® tool, and to projects in conventional to-do list tools, such as the TODOIST® tool. Unlike in such conventional tools, however, the example B-B task manager 300 of the present disclosure addresses the challenge that even the number of long-term projects can grow unwieldy and can go in and out of relevance over time. The example B-B task manager 300 supports this by enabling users to pin projects to the top of the list.

A challenge in supporting various task structures is that there are often many tasks in the long tail of the task list that are short-term, ephemeral, or in the early stages, and which often outnumber the set of long-term projects. Users can find projects and workspaces too heavy for such tasks, requiring too much effort to create and, more importantly, to get rid of or refactor, as well as "polluting" their important long-term projects with a large number of short-term or less-developed tasks. To address these tasks, the present instantiation of the B-B task manager 300 includes a "holding tank" 320H (FIG. 3), here, in the overview region 320, that acts as a default view for the user's content-item bundles. The holding tank 320H makes it easy for users to add-in content-item bundles, single tabs, and manual to-dos with no tabs attached without spending the cognitive effort to figure out how to structure and organize them and without polluting their curated project information space. Such tasks: can act as reminders for the user to come back to them; can be easily removed by changing their status to "completed," deleting them, or simply ignoring them as they drop below the fold; and can be refactored into larger content-item bundles by dragging and dropping them.

Beyond creating structures of content-item bundles, the present instantiation of the B-B task manager 300 also provides two mechanisms for keeping track of a user's progress on their individual tabs. First, the user can save tabs into the B-B task manager 300 when they are reading from web-pages in their open tabs without switching into the B-B UI 304 (FIG. 3) of the B-B task manager. To do so in this instantiation, the user can click on an extension button (not shown) in the active browser tab window (not shown) to reveal the popup window 500 (FIG. 5) of the B-B task manager 300 (FIG. 3), allowing them to save the current tab and set detailed attributes for it, such as priority and/or due date as discussed above relative to the popup window. To help a user maintain task context, the popup window 500 (FIG. 5) in this embodiment saves tabs into the most recently accessed project from the same browser window, but the user can also use a project control 512 (here, a dropdown style selector) to select a different project or create a new project (which changes the project context for the browser (tab) window). In the popup window 500, the user can also change the title of the tab in a text box 516 and, as mentioned above, take notes in the notes field 504 to externalize useful information they gathered from the current page and use the B-B task manager as an external "memory" for their task. Whenever the user opens or switches to an open tab that was previously saved, the present embodiment displays a "saved" badge on the extension's button (not shown) located in the extensions menu bar of the browser (not shown). The user can open the popup window 500 to access previously saved notes to remind them of their progress and also accumulate more information by editing the notes field 504, as desired.

Second, in the present embodiment the B-B task manager 300 (FIG. 3) includes reading-progress algorithms (not shown) for proactively estimating the reading progress of each tab to help the user remember the level of progress they had made (see, e.g., the "21%" relative to the "Best Things To Do In Spain . . . " tab link). To do so, the B-B task manager 300 tracks the scroll position and focus state of each tab using the scroll, blur, and focus JAVASCRIPT® events. Combined with the viewport height of the viewing tab (not shown), the B-B task manager 300 generates a heat map in the background of how many seconds differing regions on the webpage were in the viewport while the tab was in focus. Then, the B-B task manager 300 generates a reading-progress estimate based on the heat map assuming the user processes 100 vertical pixels per second. While there may be other more sophisticated approaches for progress estimation, such as analyzing page content, this simple heuristic is straightforward to implement, requires minimal computing resources at runtime, and worked reasonably well during testing. This estimation is calculated locally at the browser extension on all open tabs, but only synchronized with a backend database for tabs that the user had saved to the B-B task manager 300. This is done so as to only obtain information for tabs that the user has explicitly saved into the B-B task manager 300 to avoid tracking private information.

2.6 Prioritizing

Figure 6:
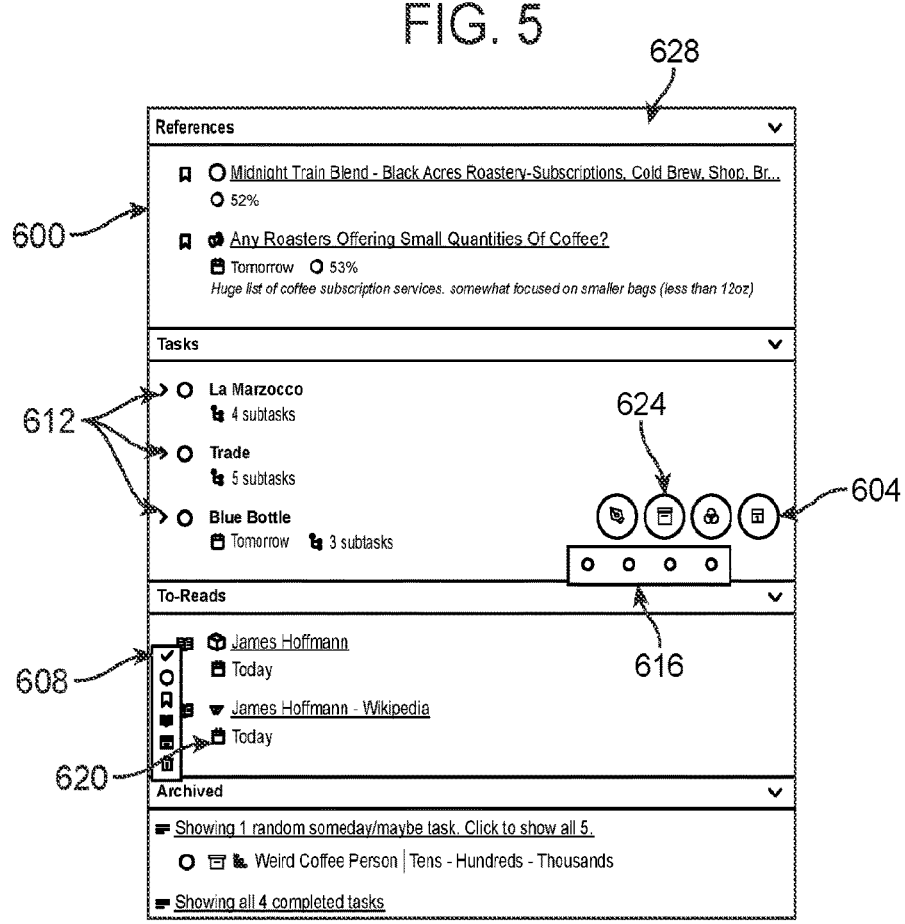
FIG. 6 is a screenshot of a portion of an example content-item-bundle viewer UI of the B-B task manager of FIG. 3.

An issue with the current browser-tab design is that it does not reflect users' varying task types and priorities. More specifically, tabs represent frequently visited references, important but unfinished tasks, and/or casual readings picked up from social media. However, besides favicons, tabs have the same visual saliency (e.g., tab-width or window size, depending on how a user is viewing resource content), making it difficult for users to prioritize their tasks and focus on the task at hand. The present instantiation of the B-B task manager 300 (FIG. 3) addresses this by providing four prioritization mechanisms, namely status-based, priority-based, schedule-based, and someday/maybe, that can be flexibly combined to address differing user needs. These four prioritization mechanisms are as follows and are represented in FIG. 6.

Status-based: Referring to both FIGS. 3 and 6, the B-B task manager 300 includes a popup menu 608 that allows a user to categorize their tabs/content items into five general statuses indicated by the leading icon of each saved tab. In the example illustrated, a to-do item is indicated by a circle icon, a to-read tab is indicated by a book icon, a reference tab is indicated by a bookmark icon, a completed item is indicated by a check icon, and a deleted item is represented by a trash-can icon. The B-B task manager 300 automatically sorts tabs/content items under collapsible-expandable sections based on their statuses. In one example, references are sorted at the top for quick access, followed by to-do, to-read, completed, and deleted. The completed sections are collapsed (see, e.g., collapsed indicators 612) by default so that they do not distract the user from their primary tasks, and deleted items are moved into a global trash can view accessible via a trashcan selector 320(3) in the overview region 320 of the B-B UI 304 of FIG. 3.

Priority-based: The B-B task manager 300 includes a priority selector 616 that allows a user to prioritize their tabs by assigning, in this example, a priority ranging from priority 1 to priority 3. In this example, the assigned priority causes the B-B task manager 300 to change the color of their status icon from gray to red, yellow, and blue, respectively relative to priorities 1 through 3. The B-B task manager uses any assigned priorities as a secondary sort key; within each status section, priority 1 tabs are sorted to the top of the section, followed by priority 2, priority 3, and default priority (unassigned).

Schedule-based: Another way to prioritize tabs saved in this embodiment of the B-B task manager 300 is for the user to assign a due date to desired ones of them. See, for example, the scheduling region 512 of FIG. 5 mentioned above. In the example shown, tabs with assigned due dates have a calendar icon under their title, followed by the due date (see, e.g., calendar icon 620 in FIG. 6). In this embodiment, scheduling a tab does not change its order but puts it into a global scheduling view accessible via a scheduling region 320S on the left-hand side of the B-B UI 304 of FIG. 3.

Someday/Maybe: Studies in both general task management and browser-tab management have identified that some users tend to keep low-priority tasks and/or tabs that they do not expect to ever complete. To prevent low priority tasks creating clutter in a user's workspace, the current instantiation of the B-B task manager 300 provides a someday/maybe control 624 (FIG. 6) that allows the user to mark tasks as "Someday/Maybe", which moves them toward the bottom of the project view 628 of FIG. 6. Similar to completed tasks, someday/maybe tasks are collapsed in this embodiment by default to prevent clutter. One challenge here is that users do not want their tasks out of sight (e.g., such as if saved as bookmarks) to avoid the "black-hole" effect where, when tasks become out of sight, the chances of completing them are significantly reduced. For this, the current instantiation of the B-B task manager 300 encourages the user to mark desired ones of their tasks as "Someday/Maybe" by showing a random low-priority item every time the user opens the corresponding project so that they are not entirely out of sight, yet also do not clutter the user's workspace.

While this instantiation provides these four mechanisms for prioritizing tasks in the B-B task manager 300, it is not expected that users will utilize all four mechanisms. Instead, a goal is to provide prioritization mechanisms flexible enough to accommodate different users, as research into general task management has pointed to users having varying strategies when prioritizing their tasks.

2.7 Automatic Content-Item Bundle Estimation/Suggestion

To lower the user costs of adopting a B-B management system of the present disclosure and as mentioned above, the illustrated instantiation of the B-B task manager 300 (FIG. 3) provides tab grouping estimations, or suggestions, to make it easier for users to save content-item bundles into the B-B management system. Driving this feature in this embodiment is a deep-learning model that segments browsing history into sessions containing page-loads supporting the same tasks. While page-loads are not equivalent to tabs (e.g., a user could load multiple pages over time in the same tab), this approach allows training data to be more readily collected using the browser extensions' history feature of the application programming interface (API).

In a beta version of the B-B task manager 300, a small set of labels was collected to train and test an example machine-learning algorithm, wherein four research team members (a designer, a product manager, and two researchers) provided their recent browsing history, resulting in a total of 2,278 page-loads. The first two authors went through each page load in their history to identify whether it was either the beginning of a new task session or not. To ensure labeling consistency, the first two authors first labeled 10.9% of the data independently and compared their labels. The two sets of labels had a high agreement level (Cohen's k=0.901, p<0.00001, N=248), so they proceeded to label the rest of the dataset without duplication. After labeling all 2,278 page-loads, 23.8% were labeled as the beginning of a new task session. The labeled dataset was then used to train a simple feed-forward network having three hidden layers of 32, 64, 128 nodes, respectively, and using the modified rectified linear unit ReLU6 as the activation function. The corresponding auto-bundling algorithms used this trained machine-learning model and the eight features listed below to make predictions about whether a page-load in history is the beginning of a new task session or not.

1. Title similarity based on universal sentence embedding vectors between the current and previous page load.
2. Normalized Levenstein distance between the URLs of current and previous page load.
3. Normalized Levenstein distance between the domains of current and previous page load.
4. Whether the current page load was a Google search.
5. Whether the previous page-load was a Google search.
6. The number of times this URL was visited in the past.
7. The number of times URL was entered in the address bar.
8. Seconds between the current and the previous page load.

These features include features based on semantic similarity between the page load and its previous page load (features 1 through 5) and behavioral features based on users' past interactions with the web-page (features 6 through 8). Features 1 through 3 are designed to capture task topic changes by measuring the semantic similarity between titles, URLs, and domain names. Features 4 and 5 are based on the intuition that many online tasks begin with a web search to fulfill some information needs. Features 6 and 7 are based on the intuition that frequently visited portal pages, such as Google Drive™, are often used as task launchers. Feature 8 is a feature commonly used by search engines for identifying new search topics. At runtime, the auto-bundling algorithms make predictions on a user's browsing history that covers their open tabs. In this example, the B-B task manager extracts query terms from any search-engine results pages to use as the suggested bundle name, and if there were no search-engine results pages within the suggested content-item bundle, the B-B task manager uses the title of the first tab within that content-item bundle.

2.7.1 Prediction Accuracy. 80% of labeled data was sampled for training the machine-learning model, 10% for validation to prevent over-fitting, and 10% for testing accuracy of the machine-learning model. The complete machine-learning model trained on all eight features had an overall labeling accuracy of 92.1% (precision: 0.86; recall: 0.83; F1: 0.84 for the start-of-task label). The labeling accuracy was then compared for using only semantic features versus only behavioral data. Results showed that the model trained on semantic features (1 through 5) had a labeling accuracy of 76.3%, and the machine-learning model trained on behavioral features (6 through 8) had a labeling accuracy of 86.4%. This result suggests that both semantic and behavioral features contributed to the higher accuracy of the machine-learning model trained on all features. To reduce complexity of the machine-learning model and to improve runtime efficiency, differing feature combinations were iterated through to see if it is possible to use only a subset of features and achieve similar performance to the complete machine-learning model. In the end, features 1, 2, 3, 4, and 8 were used to generate the machine-learning model deployed in the instantiated (beta-version) browser extension, and the deployed machine-learning model had an overall labeling accuracy of 90.8% (precision: 0.84; recall: 0.79; F1: 0.81 for the start-of-task label).

This preliminary result is acknowledged to be limited by the size of the dataset, and the accuracy of the machine-learning model in a field deployment will likely be lower than on the test set due to behavioral and task topics differences between individuals. To address this, the Open Tabs pane (FIG. 3) of the example instantiation of the B-B task manager 300 allows a user to recover from the machine-learning model's mistakes by first clicking on a content-item bundle's title to select all tabs in it, and then deselecting tabs that do not belong in the same task, or selecting additional tabs to include them. While more sophisticated models with larger training data could further improve accuracy, in this current work, the focus was on examining the effects of providing automatic task bundling suggestions on user experience holistically by conducting a beta field deployment study of the B-B task manager 300.

2.8 Implementation Notes

The above-described example B-B UI 304 (FIG. 3) was instantiation as a browser extension in order to simplify creating a prototype of the B-B task manager 300. However, those skilled in the art will readily appreciate that current limitations of the browser API limited the features that a B-B task manager of the present disclosure can provide. Indeed, modifying the browser app itself with B-B-task-manager functionality or creating from scratch a new browser app containing B-B-task-manager functionality would have provided much broader latitude to explore the design space of changing existing tab interfaces. Consequently, skilled artisans will understand that B-B-task-manager functionality can be deployed in many ways, including within a browser app itself, for example, either within native browser software code or an internal software module that modifies original browser-software code. Examples of additional B-B task-manager functionality that can be deployed in other embodiments are presented below in section 2.9.

The example browser-extension instantiation discussed above was implemented in approximately 13,000 lines of Microsoft TypeScript™ programming language and used the open-source React-JS library and the open-source Bulma cascading style sheet (CSS) framework for building UI components. Google, LLC Firestore™ scalable datastore toolset was used for backend functions, database, and user authentication, which allowed participants to access their tabs across devices. For privacy concerns, the TENSOR-FLOW®-JS machine-learning toolset was used to drive the task bundle prediction feature, which allowed Tabs.do to make tab grouping predictions locally on participants' computers without sending their open tab information to a backend server. This instantiation of the B-B task manager was implemented as a cross-platform browser extension using the now-standardized Web Extensions APIs.

2.9 Additional/Optional Functionality and Features

2.9.1 Cross-device Functionality

While the above instantiation of the B-B task manager 300 (FIG. 3) synchronizes in-browser tasks across multiple computers, extending it to support mobile devices and other desktop applications is an option. For example, content-item, or task, content-item bundles in a B-B task manager of the present disclosure can be used as basic building blocks to connect devices and/or applications with one another to build a more holistic system. Such an approach would enable users, for example, to schedule and surface a to-read content-item bundle/task on their mobile phones during an upcoming commute or seamlessly bundle browser tabs with other local applications and/or files supporting the same task, among many other possibilities.

2.9.2 Browser-UI Features

As noted above, current web extension APIs have very limited support for changing the interfaces and interactions of browser tabs (windows). Therefore, features that an extension-type B-B task manager can provide are limited. For example, it is difficult to change the structure and/or visual saliency of tabs on the native browser UI (such as colors, widths, labels, etc.) to surface content-item bundle relationships and/or content-item bundle suggestions with current browser APIs. Other embodiments of the B-B task manager may include, for example, one or more of the following features, among others:

Variable tab sizing (e.g., width and/or height) based on a parameter, such as priority or deadline.
Differing tab coloring based on inclusion in a content-item bundle and/or project.
Display in tab of the tab type (e.g., to-read, reference, completed).
Display in tab of the level of the tab within the relevant content-item bundle.
Display in tab of the bundle identifier, project identifier, and/or tab identifier.

As another example of limitations imposed by the limited state of current web extension APIs, the above-detailed instantiation of the B-B task manager uses the "saved" badge on the extension icon to show that it was previously saved. However, current web extension APIs lack mechanisms for the browser-extension-based instantiation to further surface statuses or structures that a user assigns to their tabs, such as due dates or projects, but other embodiments of the B-B task manager could be built to include such features.

2.9.3 Copied-Item and Annotation Functionality

While the task-centric approach of the example B-B task manager 300 (FIG. 3) may provide a useful step forward in helping people with their online tasks, it represents only one piece of a richer tapestry of functionality that would be necessary to support the complex learning, decision-making, and sensemaking that people engage in on the Internet. One way to think of this larger ecosystem might include a B-B task manager of the present disclosure as a hub for creating, organizing, and managing tasks, but with additional functionality on each end. For example, on the content-item bundle creation end, a B-B task manager of the present disclosure may be configured to allow a user to copy and save within a content-item bundle items, such as a clip or snippet, or from a resource, such as a webpage or other content source. In addition, a B-B task manager of the present disclosure could be configured to allow a user to add annotations when exploring unfamiliar information. On the other end, as a user collects more information there is an increasing need for workspaces that can help them structure, compare, synthesize, and take action on the information. Enabling a B-B task manager of the present disclosure to seamlessly pass information and synchronize it with specialized workspaces for differing types of tasks is a beneficial feature.

Figure 7B:
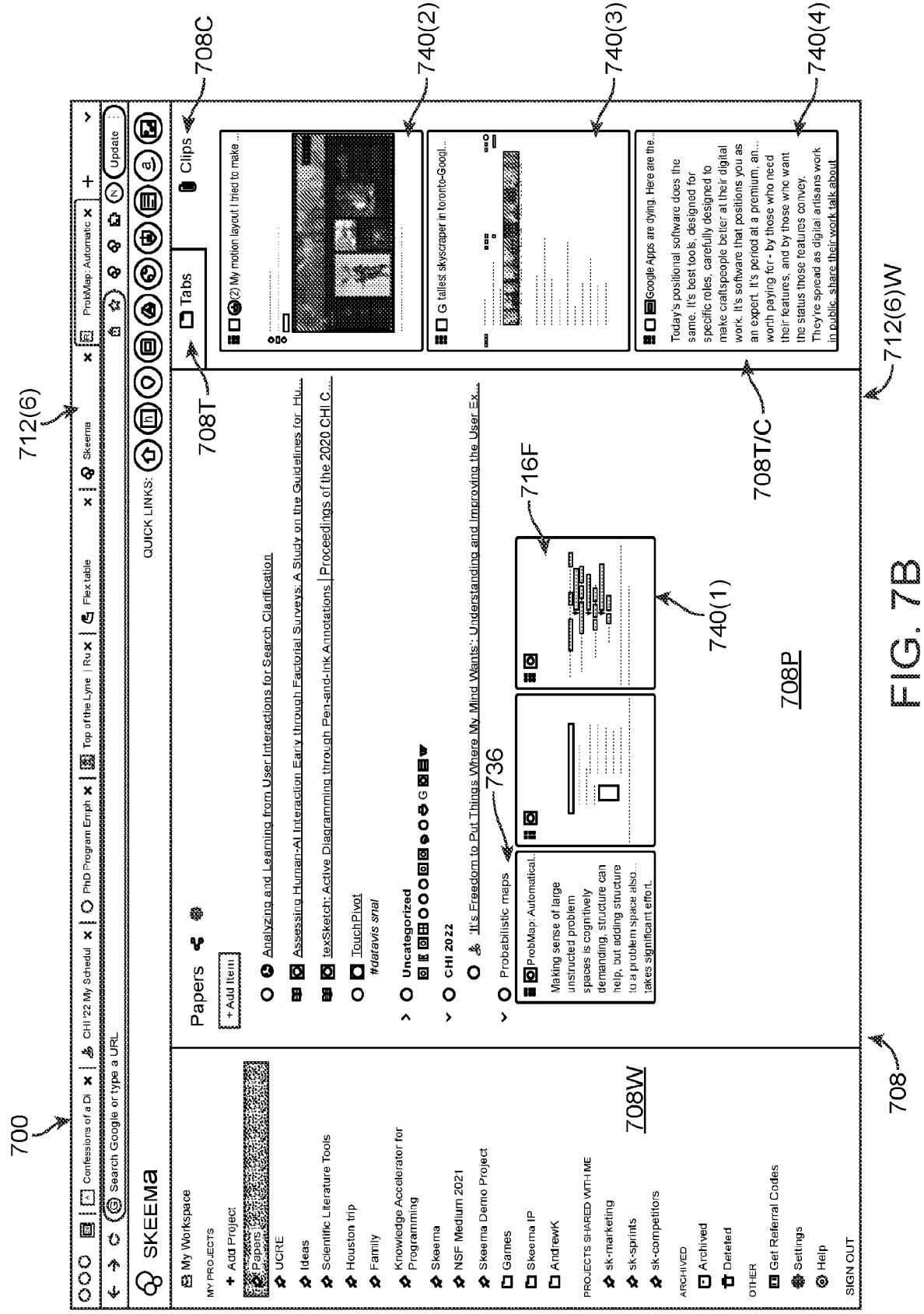
FIG. 7B is screenshot of the web browser of FIG. 7A, showing an active-tab window displaying a UI of a B-B task manager of the present disclosure, wherein the user has copied the information clipped in FIG. 7A into a content-item bundle.
Figure 7C:
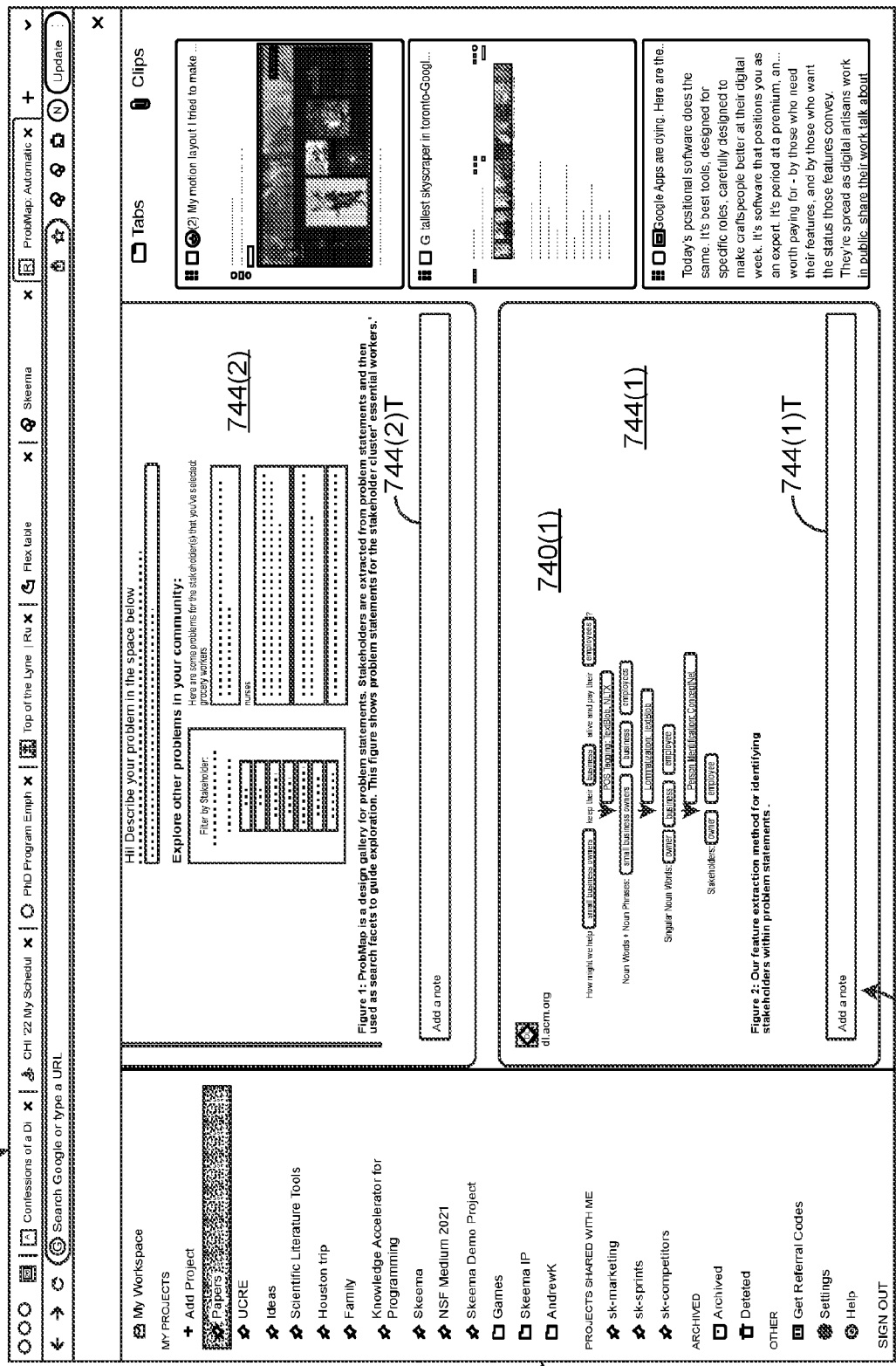
FIG. 7C is a screenshot of the web browser of FIGS. 7A and 7B, showing a gallery view of clipped items.

FIGS. 7A-7C illustrate some example clip-and-save features that allow a user to clip information (i.e., a content item) from a desired resource and save the clipped information to one or more content-item bundles. Some or all of the clip-and-save features described in connection with FIGS. 7A-7C and/or similar features, can be implemented in B-B content-item organization software of the present disclosure, such as in the B-B task manager 300 of FIGS. 3-6 described above.

Referring first to FIG. 7A, this figure shows a browser UI 700 of a web-browser 704 that includes a B-B task manager (not shown, but providing a B-B UI 708 of FIG. 7B and other features). In this example of FIG. 7A, the browser UI 700 has seven open tabs 712(1) to 712(7) located across the top of the B-B UI in a conventional manner, and the tab 712(7) is the current active tab, with the corresponding tab window 712(7)W visible to the user. In FIG. 7A, the tab window 712(7)W is displaying a resource 716 available at the URL 716A appearing in an address field 720 of the browser UI in a conventional manner. In this example, the resource 716 includes a digital publication 716P containing text and figures, such as the FIG. 716F currently visible in the tab window 712(7)W.

In the embodiment shown, the B-B task manager provides the browser UI 700 with a clipping control, here a pull-out type button 724 on the right-hand side of the tab window 712(7)W. When the user hovers an onscreen cursor 728 over the button 724, the button visually appears to extend (not shown) out of the right-hand border of the tab window 712(7)W. Once the clipping control button 724 is extended into view (not shown) and the onscreen cursor 728 is positioned over the button, the user can select the button (e.g., by right-clicking on a computer mouse (not shown)) to put the B-B task manager into a clipping (copying) mode. When the B-B task manager is in the clipping mode, the user can select information contained in the resource 716.

In the example shown, the clipping mode causes the B-B task manager to gray-out the entirety of the tab window 712(7)W in a translucent manner so that features of the resource 716 displayed in the tab window are still visible to the user, but in a darkened manner. Then, the user can manipulate the onscreen cursor 728 (e.g., in a conventional manner) to define a selection window 732 (that in this embodiment visually appears to be a transparent window through the grayed-out regions) that the B-B task manager 704 uses to determine which information to capture from the resource 716 for the clip-and-save operation that the user is desiring to perform. In this example, the user has defined the selection window 732 so as to select the displayed FIG. 716F of the publication 716P in connection with a content-item bundle 736 (FIG. 7B) concerning probabilistic maps and titled "Probabilistic maps". In this example, the B-B task manager uses the selection window 732 to automatically capture where the clip was taken (e.g., the URL 716A

(FIG. 7A)), its visual appearance and any underlying code (e.g., HTML code), and its location within the resource 716 to allow a user to return to it or for downstream systems to make use of the context of the page (e.g., for filtering or searching).

FIG. 7B illustrates the browser UI 700 with the tab 712(6) being the currently active tab and corresponding tab window 712(6)W being visible to the user. In this example, the tab 712(6) is the tab of the browser UI that displays the B-B UI 708 of the B-B task manager. As seen in FIG. 7B, this embodiment of the B-B UI 708 includes three primary views, namely, a workspace view 708W, a project view 708P, and an open-tabs/unsaved clips (OT/UC) view 708T/C. As can be readily seen in FIG. 7B, the user has already clipped the FIG. 716F (FIG. 7A) and moved it to the content-item bundle 736 in the project view 708P in FIG. 7B, wherein it appears as a captured clip 740(1). As noted above, in this example the clip 740(1) not only includes an image (here, the FIG. 716(F) from the resource 716 (FIG. 7A)), but it also includes related information that the B-B task manager obtained via the web browser 704 (FIG. 7A), such as where the clip was taken, any underlying code, and a location within the resource. Not illustrated in FIG. 7B is how the clip 740(1) ended up as part of the content-item bundle 736. However, an example process for how the clip 740(1) became part of the content-item bundle 736 is described immediately below.

In this embodiment, the OT/UC view 708T/C displays either all of the currently open tabs (e.g., the tabs 712(1) to 712(7) (FIG. 7A)) or all currently captured clips, such as clips 740(2) to 740(4) (FIG. 7B), that a user has not yet either discarded or saved to a project, such as the user has done with clip 740(1). In this example, the user can select between displaying tabs and displaying captured clips in the OT/UC view 708T/C using, respectively, a Tabs selector 708T and a Clips selector 708C. In the present example of capturing the clip 740(1) as discussed above relative to FIG. 7A, once the user captured the clip 740(1), it was available for the B-B task manager to display in the OT/UC view 708T/C, for example, when the user had selected the Clips selector 708C. After the B-B task manager made the clip 740(1) visually available to the user in the OT/UC view 708T/C, the user moved this clip from the OT/UC view to the project view 708P, for example, via a drag-and-drop operation. It is noted that captured clips can be of any types, such as image clips, text clips, sound-based clips, audio-visual clips, and any combination thereof.

In this embodiment, the web-browser 704 and the B-B UI 708 and other features of the B-B task manager all reside and run on a client device (not shown), such as a laptop computer or desktop computer, among others, and long-term storage and backend features are provide remotely (not shown) from the client device, such as at one or more servers and/or on the computing cloud. In this connection and in this example, all of the open tabs and captured clips displayed/displayable in the OT/UC view 708T/C are stored locally on the client device. However, projects, content-item bundles, and related information and data are stored remotely from the client device. Consequently, when a user moves one or more tabs and/or one or more clips from the OT/UC view 708T/C, in addition to the relevant items visually moving from one screen location to another, once each item is dropped into the project view 708P, the B-B task manager saves that item to a datastore offboard the client device.

Other aspects of the B-B UI 708 of FIG. 7B may be the same as or similar to like features described above, for example, in connection with FIGS. 1 through 6.

Referring to FIG. 7C, and also to FIG. 7B, FIG. 7C illustrates a gallery view 744 that the B-B task manager displays when, for example, the user clicks (e.g., double-clicks) on any of the clips, such as the clips 740(1) to 740(4) (FIG. 7B). In some embodiments, if the clip the user clicks upon is a clip in the project view 708P (FIG. 7B), such as the clip 740(1), then the B-B task manager may display only that clip in the gallery view 744. In some embodiments, if the clip the user clicks upon is a clip in the OT/UC view 708T/C (FIG. 7B), such as any one of the clips 740(2) to 740(4), then the B-B task manager may display all of clips present in the OT/UC view 708T/C. In the example shown, each clip displayed in the gallery view 744 is displayed in a corresponding clip window, here clip window 744(1), 744(2), that has a text field 744(1)T, 744(2)T, respectively, that allows the user to add any desired note(s) to the clip. Any note that the user inputs is saved either locally to or remotely from the client device, depending on which view the relevant clip is in, here, either the OT/UC view 708T/C (FIG. 7B; locally saved) or the project view 708P (FIG. 7B; remotely saved). In this example, the clip windows 744(1) and 744(2) are displayed over a translucent grayed-out background over the B-B UI 708 and portions of the browser UI 700.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of providing a user interface (UI) that operatively interfaces with content-access software to assist a user with creating a project composed of a task hierarchy that includes an organization of a plurality of content items accessed via the content-access software, the method being performed by software providing the UI and comprising:

displaying to the user a plurality of first non-empty content-item bundles in an open-viewer region, wherein each first non-empty content-item bundle contains differing ones of the plurality of content items accessed via the content-access software; receiving a project title for the project from the user;

displaying to the user the project title in a project-view region, wherein the project-view region displays the task hierarchy simultaneously with the plurality of first non-empty content-item bundles in the open-viewers region;

building the task hierarchy in the project-view region using content-item bundles that include the first non-empty content-item bundles, wherein, the task hierarchy has a plurality of nested levels of ones of the content-item bundles that include a higher content-item-bundle level and a lower content-item-bundle level nested in the higher-content-item-bundle level;

receiving a user input from the user that places at least one of the first non-empty content-item bundles on the lower content-item-bundle level; and in response to receiving the user input, displaying the task hierarchy in the project-view region showing the at least one first non-empty content-item bundle in a nested relationship below an existing content-item bundle on the higher content-item-bundle level.

2. The method of claim 1, wherein ones of the plurality of content items comprise a plurality of corresponding uniform resource locators.

3. The method of claim 1, wherein at least one of the plurality of content items comprises a user-copied portion of a resource that the user accessed via the content-access software.

4. The method of claim 1, wherein at least one of the plurality of content items comprises a uniform resource locator and a user-copied portion of a resource that the user accessed via the content-access software using the uniform resource locator.

5. The method of claim 1, wherein the content-access software comprises web-browsing software.

6. The method of claim 1, wherein the UI allows the user to build the task hierarchy by dragging and dropping individual ones of the plurality of content items bundles from the open-viewers region.

7. The method of claim 1, wherein UI allows the user to build the task hierarchy by dragging and dropping individual ones of the first non-empty content-item bundles from the open-viewers region.

8. The method of claim 1, further comprises:

receiving, from the content-access software, information regarding a plurality of currently open content-item viewers;

based on the information, automatically determining a corresponding one of the first content-item bundles based on a subject-matter relationship between at least two of the plurality of open-item viewers; and displaying the corresponding one of the first content-item bundles in the open-viewers region.

9. The method of claim 8, wherein displaying of the corresponding one of the first content-viewer bundles includes:

displaying a first bundle identifier for the corresponding one of the first content-viewer bundles; and displaying, in association with the bundle identifier, a content-viewer identifier of each of the plurality of currently open content-item viewers automatically determined to have the subject-matter relationship with one another.

10. The method of claim 9, wherein one of the plurality of currently open content-item viewers automatically determined to have the subject-matter relationship contains search results resulting from a search string, and the first bundle identifier comprises at least a portion of the search string.

11. The method of claim 9, wherein the first bundle identifier is a title of one of the plurality of currently open content-item viewers automatically determined to have the subject-matter relationship with one another.

12. The method of claim 1, wherein at least two of the two or more content-item bundles are on a common nesting level.

13. The method of claim 1, wherein at least two of the two or more content-item bundles are on differing nesting levels.

14. The method of claim 1, further comprising a content-item clipping interface that allows the user to clip information from a resource that the user has accessed via the content-access software, wherein the content-item clipping interface further allows the user to copy the information into a desired one of the plurality of content-item bundles displayed in the project-view region.

15. The method of claim 1, wherein, prior to the receiving of user input that places at least one of the first non-empty content-item bundles on the lower content-item-bundle level, the method further comprises creating the existing content-item bundle as an empty content-item bundle, wherein the creating of the empty content-item bundle includes receiving from the user a name for the empty content-item bundle.

16. The method of claim 1, wherein the receiving of the input that places at least one of the first non-empty content-item bundles on the lower content-item-bundle level includes receiving dragging and dropping input of the at least one of the first non-empty content-item bundles from the open-viewers region to the task hierarchy in the project-view region.

17. The method of claim 10, wherein ones of the plurality of currently open content-item viewers corresponding to ones of the search results, and the method further includes displaying the ones of the plurality of currently open content item viewers in association with the first bundle identifier as a corresponding one of the first non-empty content-item bundles in the open-viewers region.

18. The method of claim 1, further comprising:

when the user is viewing content of a first content-item viewer, receiving a user input to open a popup window that includes a notes field for receiving user-input notes related to the content of the first content-item viewer; and storing the user-input notes so that the user-input notes are available to the user in the task hierarchy displayed in the project-view region.

19. The method of claim 1, further comprising:

when the user is viewing content of a first content-item viewer, receiving a user input to open a popup window that includes a priority-icon-selection region for receiving a user-selection of a priority the user desires the UI to assign to the content; and storing the priority so that the priority is available to the user in the task hierarchy displayed in the project-view region.

20. The method of claim 1, further comprising:

when the user is viewing content of a first content-item viewer, receiving a user input to open a popup window that includes a calendaring and scheduling region for receiving user input for scheduling a task relating to the content; and storing the scheduling so that the scheduling is available to the user in the task hierarchy displayed in the project-view region.

21. A non-transitory computer-readable storage medium containing computer executable instructions for performing the method of claim 1.

* * * * *